US008482788B2

(12) United States Patent   (10) Patent No.: US 8,482,788 B2
Yoshida   (45) Date of Patent: Jul. 9, 2013

(54) IMAGE PROCESSING APPARATUS, TERMINAL, PRINTER APPARATUS AND IMAGE PROCESSING METHOD, HAVING IMAGE RESTORING FUNCTION

(75) Inventor: Hajime Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 687 days.

(21) Appl. No.: 12/700,399

(22) Filed: Feb. 4, 2010

(65) Prior Publication Data

US 2010/0201995 A1   Aug. 12, 2010

(30) Foreign Application Priority Data

Feb. 10, 2009 (JP) ................................. 2009-028182

(51) Int. Cl.
*G06K 15/02* (2006.01)
*G06F 3/12* (2006.01)
*G06K 15/00* (2006.01)
*H04N 1/32* (2006.01)
*H04N 1/41* (2006.01)
*G06K 9/00* (2006.01)

(52) U.S. Cl.
USPC ........... 358/1.2; 58/1.14; 58/1.13; 58/426.06; 58/403; 58/468; 382/100

(58) Field of Classification Search
None
See application file for complete search history.

(56) References Cited

U.S. PATENT DOCUMENTS

| 6,627,870 | B1 | 9/2003 | Lapstun et al. |
| 7,058,196 | B2* | 6/2006 | Takaragi ..................... 382/100 |
| 2001/0029513 | A1* | 10/2001 | Kuwano et al. ............... 707/522 |
| 2003/0156733 | A1* | 8/2003 | Zeller et al. .................... 382/100 |
| 2006/0056371 | A1* | 3/2006 | Sakuda et al. ................. 370/338 |
| 2007/0012769 | A1* | 1/2007 | Tanaka ........................... 235/432 |
| 2007/0076234 | A1* | 4/2007 | Hopper et al. ............... 358/1.12 |
| 2007/0091381 | A1* | 4/2007 | Sato .............................. 358/448 |
| 2007/0297014 | A1* | 12/2007 | Kuga et al. ................... 358/3.28 |
| 2008/0192291 | A1* | 8/2008 | Honda et al. ................. 358/1.15 |
| 2008/0198405 | A1* | 8/2008 | Honda et al. ................. 358/1.15 |
| 2008/0198423 | A1* | 8/2008 | Ando et al. ............... 358/426.06 |
| 2009/0251564 | A1 | 10/2009 | Ito |
| 2011/0051173 | A1* | 3/2011 | Yagishita ..................... 358/1.14 |
| 2011/0085193 | A1* | 4/2011 | Sato .............................. 358/1.13 |

FOREIGN PATENT DOCUMENTS

| JP | 5-110825 A | 4/1993 |
| JP | 2004-282668 A | 10/2004 |
| JP | 2004-304546 A | 10/2004 |
| JP | 2006-253973 A | 9/2006 |
| JP | 2007-81936 A | 3/2007 |
| JP | 2007-329568 A | 12/2007 |
| WO | 2007/063680 A1 | 6/2007 |

* cited by examiner

*Primary Examiner* — Satwant Singh

(74) *Attorney, Agent, or Firm* — Birch, Stewart, Kolasch & Birch, LLP

(57) ABSTRACT

An image processing apparatus, a terminal, a printer apparatus and an image processing method for restoring, when document image obtained from an original image is read and turned to electronic data, the image data in the form of electronic data to the state of original image, are provided. An image processing apparatus reading a document image formed from an original image includes a print condition recognizing unit recognizing a mark on the read image and confirming contents represented by the mark; and an image restoring unit restoring, if the print condition recognizing unit confirms that conditions for forming a document are included in the mark, the read image to the state of original image based on the conditions for forming the document represented by the mark.

18 Claims, 23 Drawing Sheets

FIG. 15

| FIT PAGE | RESOLUTION RATIO |
|---|---|
| $B_n \Leftrightarrow A_{n-1}$<br>(B5 → A4) | 1.15 |
| $A_n \Leftrightarrow B_n$<br>(A4 → B4) | 1.22 |
| $B_n \Leftrightarrow B_{n-1}$<br>$A_n \Leftrightarrow A_{n-1}$<br>(B5 → B4) | 1.41 |

FIG. 16

| N-up | ROTATION | SHORTER SIDE DIVISION NUMBER | LONGER SIDE DIVISION NUMBER | RESOLUTION RATIO |
|---|---|---|---|---|
| 1 | | 1 | 1 | 1.00 |
| 2 | NECESSARY | 1 | 2 | 1.41 |
| 4 | | 2 | 2 | 2.00 |
| 6 | NECESSARY | 2 | 3 | 2.82 |
| 8 | NECESSARY | 2 | 4 | 2.82 |
| 9 | | 3 | 3 | 3.00 |
| 16 | | 4 | 4 | 4.00 |

IMAGE PROCESSING APPARATUS, TERMINAL, PRINTER APPARATUS AND IMAGE PROCESSING METHOD, HAVING IMAGE RESTORING FUNCTION

CROSS-REFERENCE TO RELATED APPLICATION

This nonprovisional application claims priority under 35 U.S.C. §119(a) on Patent Application No. 2009-028182 filed in Japan on Feb. 10, 2009, the entire contents of which are hereby incorporated by reference.

BACKGROUND OF THE INVENTION

1. Field of the Invention

The present invention relates to an image processing apparatus and, more specifically, to an image processing apparatus, a terminal, a printer apparatus and an image processing method that read an image of a document obtained from an original image, analyze conditions when the document was formed from a mark on the read image, and restore the state of original image from the read image based on the conditions.

2. Description of the Background Art

Recently, in corporate offices and the like, electrophotographic type MFPs (Multifunction Peripherals) attaining functions of facsimile, copying machine and printer have come to be installed and used.

Latest MFPs have a so-called N-up function, which will be described in the following.

The N-up function refers to a function of printing, when MFP prints image data on a sheet of paper, image data of a plurality of pages collectively on one sheet of paper. In the following, printing of image data of N pages (N is an integer larger than 0) on a sheet of recording paper will be referred to as "N-up printing." By way of example, printing of image data of 2 pages and printing of image data of 4 pages collectively on a sheet of paper are referred to as "2-up printing" and "4-up printing," respectively. Printing of image data of 1 page on a sheet of paper is a printing process not utilizing the N-up function. Even in such a case, such printing process may be referred to as "1-up printing" in the following.

The N-up function provided in an MFP can reduce the number of sheets to be printed. Therefore, cost and resources related to the recording paper can be saved.

It becomes desirable, as MFPs come to have the N-up function, to have an N-up printed document image turned back to electronic data, to process the electronic data as desired by the user and to have the processed data printed on a different sheet of paper.

In order to meet such a demand, Japanese Patent Laying-Open No. 2006-253973 (hereinafter referred to as "'973 application") discloses a technique of determining whether a document read by a document reader of a copying machine has been N-up printed. According to '973 application, when image data of a plurality of pages are N-up printed, the image data are printed sectioned from each other by partition lines such as dotted lines. The copying machine described in '973 application determines whether the document has been N-up printed or not, depending on whether the partition line is drawn on the document. When the copying machine reads a document image and a partition line is found in the image, it divides the read document image data along the partition line. In accordance with a user instruction, the copying machine processes the divided image data and prints the data on different sheets of recording paper.

Japanese Patent Laying-Open No. 2004-304546 (hereinafter referred to as "'546 application") also discloses a technique of determining whether a document read by a document reader of a copying machine has been N-up printed. According to '546 application, when a plurality of image data are N-up printed, a border line is drawn between each of the image data. The border line may be a solid line, a dotted line or a band-like blank line. The copying machine described in '546 application determines, when it reads images on a document, whether or not the document has been N-up printed, by determining whether or not there is a border line drawn on the document. If it is determined that the document has been N-up printed, the copying machine divides the image data along the border line, and in accordance with a user instruction, the copying machine processes the divided image data and prints the data on different sheets of recording paper.

To save resources, various documents in corporate offices come to be increasingly managed in the form of electronic data. By making documents electronically available, paper resources can be saved. Therefore, it is desired to have an image once printed on a sheet of recording paper turned back to the form of electronic data, to be stored and managed by a computer.

In that case, when the read image is turned to electronic data and the image data is displayed on a display, it is desirable that the displayed image data is in a direction easily viewable for the user. By way of example, assume that sentences are written on a document and the document image is turned to electronic data and displayed on a display. If the displayed characters are upside-down or laid-out sideways, handling of the electronic data can be troublesome for the user, as he/she must manually change or rotate the direction of image data on the display.

When an N-up printed document image is to be divided to the original image data and to be turned to electronic data, it is possible to utilize the techniques of determining whether or not N-up printing has been done, as described in '973 and '546 applications. Use of the techniques described in '973 and '546 applications alone is not sufficient, however, since the following problem arises. According to '973 and '546 applications, whether N-up printing has been done or not is determined simply by checking whether there is a partition line or border line. When the N-up printed document image is divided using such a determination method only, it is unknown whether or not the divided image data are fully restored to the state of original images before N-up printing. Therefore, simply by the technique described in '973 and '546 applications, the problem related to the restoration of images that have been turned to electronic data cannot be solved.

SUMMARY OF THE INVENTION

An object of the present invention is to provide an image processing apparatus, a terminal, a printer apparatus and an image processing method, to restore, when document images obtained from original images are read and turned to electronic data, the image data turned to the electronic data to the state of original images.

According to an aspect, the present invention provides an image processing apparatus reading a document image obtained based on an original image, including: a recognizing unit recognizing a mark on the read image; a confirming unit confirming, from the mark, contents of the mark recognized by the recognizing unit; and an image restoring unit, restoring, if it is confirmed by the confirming unit that a document forming condition is included in the mark, the read image to a state of the original image based on the document forming condition indicated by the mark.

The recognizing unit recognizes the mark on the read image. The confirming unit confirms, from the mark, contents of the mark recognized by the recognizing unit. If the confirming unit confirms that the mark includes conditions for forming a document, the image restoring unit restores the read image to the state of the original image, in accordance with the conditions for forming the document indicated by the mark.

When the user displays the image restored by the image restoring unit on a display, it is displayed in the same state as the original image. It is unnecessary for the user, each time the image is turned to electronic data, to modify the image to be displayed in the same state as the original image. Therefore, user convenience is improved after the document image is turned to electronic data. Thus, an image processing apparatus that can restore, when a document image obtained from an original image is read and turned to electronic data, the image data that has been turned to electronic data, to the state of the original image is provided.

Preferably, the image restoring unit includes a direction restoring unit restoring, if it is confirmed by the confirming unit that document forming condition is included in the mark, direction of the read image based on the document forming condition indicated by the mark.

More preferably, the image processing apparatus further includes an image input unit inputting the document image. The confirming unit includes a position information confirming unit confirming position information related to a position where the mark is formed on the document image, based on the mark on the input image input to the image input unit. The direction restoring unit restores the image direction of the input image, by comparing the position of the mark on the input image and the position information.

When the user displays the image stored by the image restoring unit on a display, the image is in the same direction as the original image. It is unnecessary for the user, each time the image is turned to electronic data, to modify the image direction. Therefore, user convenience is improved after the document image is turned to electronic data. Thus, an image processing apparatus that can restore, when a document image obtained from an original image is read and turned to electronic data, the image data that has been turned to electronic data, to the state of the original image is provided.

More preferably, a plurality of images are drawn on divided areas of the document input to the image input unit. The mark formed on the document allows confirmation of information related to the area division of the document. The confirming unit further includes an area division information confirming unit confirming the information related to the area division based on the mark on the input image. The image restoring unit further includes a dividing unit dividing the image with the image direction restored, in accordance with the information related to the area division confirmed by the area division information confirming unit.

Even when images of a plurality of pages are collectively printed on a document, the image of each page is divided to be displayed in the same direction as the original image. Therefore, user convenience is improved after images of such a document are read and turned to electronic data.

More preferably, a plurality of images are N-up printed on the document input to the image input unit. The area division information is N-up number.

Even the N-up printed document images can be divided such that each image is displayed in the same manner as the original image. Therefore, user convenience is improved after such images are turned to electronic data.

More preferably, the image processing apparatus further includes an erasing unit erasing the mark from an image restored by the image restoring unit.

The erasing unit erases the mark from the restored image. If the input image is rotated and stored, the mark becomes unnecessary. Therefore, unnecessary information can be erased.

More preferably, the mark on the read image is a two-dimensional bar-code. The confirming unit confirms contents represented by the two-dimensional bar-code recognized by the recognizing unit.

Techniques related to two-dimensional bar-codes have been well established and readily implemented. Two-dimensional bar-codes enable encoding of a large amount of information with a small image. Therefore, there is much margin when information is recorded in the form of a code image on a document, and information recording can be realized with a compact space on a part of the document, not much affecting the appearance of the document.

More preferably, the image input unit receives as inputs a plurality of document images. A mark is formed on at least a first page of the document image of the plurality of document images. If the recognizing unit fails to recognize a mark on each of images of the second and the following pages, the image restoring unit restores the images to states of original images in the same manner as the image of the first page.

More preferably, the image input unit receives as inputs a plurality of document images. A mark is formed on at least a first page of the document image of the plurality of document images. The image restoring unit selectively executes a process of restoring the images to states of original images in the same manner as the image of the first page, or not executing any process on the images, depending on whether or not the recognizing unit recognized the mark on each of images of the second and the following pages.

More preferably, the mark formed on the document further allows confirmation of size of the original image. The confirming unit further includes a size confirming unit confirming the size of the original image from the mark recognized by the recognizing unit. The image restoring unit further includes a size restoring unit enlarging or reducing the read image so that the size of the read image matches the size of the original image confirmed by the size confirming unit.

More preferably, the image input unit includes a document placing table formed of a transparent member for placing a document, an exposure lamp arranged below the document placing table, and a document reading unit reading an image of the document, by detecting intensity of light emitted from the exposure lamp and reflected from the document placed on the document placing table.

According to a further aspect, the present invention provides a terminal connected to a printer apparatus. The terminal includes an image generating unit allowing a user to generate image data, and a mark forming unit forming a mark on a print image when the image data generated by the image generating unit is printed, in response to a user instruction. The mark formed on the image data by the mark forming unit allows confirmation of condition for generating the image data. The terminal further includes a transmitting unit transmitting a print instruction instructing printing of the image data with the mark formed, to the printer apparatus.

Preferably, the mark forming unit forms a mark only on a first page of printed images when the print image includes a plurality of pages.

More preferably, the print image has a rectangular shape. The mark forming unit forms a mark at any of the corner areas of the print image.

More preferably, the mark forming unit forms no mark on the print image when none of the corner areas of the print image is blank. The terminal further includes an indicating unit indicating for user, if no mark is formed by the mark forming unit on the print image, that formation of a mark is impossible.

According to another aspect, the present invention provides a printer apparatus connected to a terminal. The printer apparatus includes: a receiving unit receiving a print instruction instructing printing of a print image having a mark formed thereon, from the terminal; and a printing unit printing, in response to reception of the print instruction by the receiving unit, the mark of the print image with invisible ink invisible to human eyes, and images other than the mark of the print image with normal ink, on a sheet of recording paper.

According to a further aspect, the present invention provides an image processing method, including: an image generating step at which a user generates image data; and a mark forming step of forming a mark on a print image when the image data generated at the image generating step is printed, in response to a user instruction. The mark formed on the image data at the mark forming step allows confirmation of a condition for generating the image data. The image processing method further includes: a printing step of printing the print image on a sheet of recording paper; an image reading step of reading the print image printed on the sheet of recording paper at the printing step; a recognizing step of recognizing the mark on the image read at the image reading step; a confirming step of confirming, from the mark, contents represented by the mark recognized at the recognizing step; and an image restoring step of restoring, if it is confirmed at the confirming step that the mark includes condition for generating the image data, the read image to a state of an original image, based on the condition for generating the image data represented by the mark.

Preferably, the printing step includes a step of printing the mark of the print image with invisible ink invisible to human eyes, and images other than the mark of the print image with normal ink, on the sheet of recording paper.

As described above, according to the present invention, when the user displays the image processed by the image processing apparatus in accordance with the present invention on a display device, the image is displayed in the same state as the original image. It is unnecessary for the user, each time the image is turned to electronic data, to modify the image to be displayed in the same state as the original image. Therefore, user convenience is improved after the document image is turned to electronic data. Thus, an image processing apparatus, a terminal, a printer apparatus and an image processing method that can restore, when a document image obtained from an original image is read and turned to electronic data, the image data that has been turned to electronic data to the state of the original image, can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows calculation of resolution for fit-page printing.

FIG. 16 shows pieces of information related to N-up printing.

DESCRIPTION OF THE PREFERRED EMBODIMENTS

Figure 1:
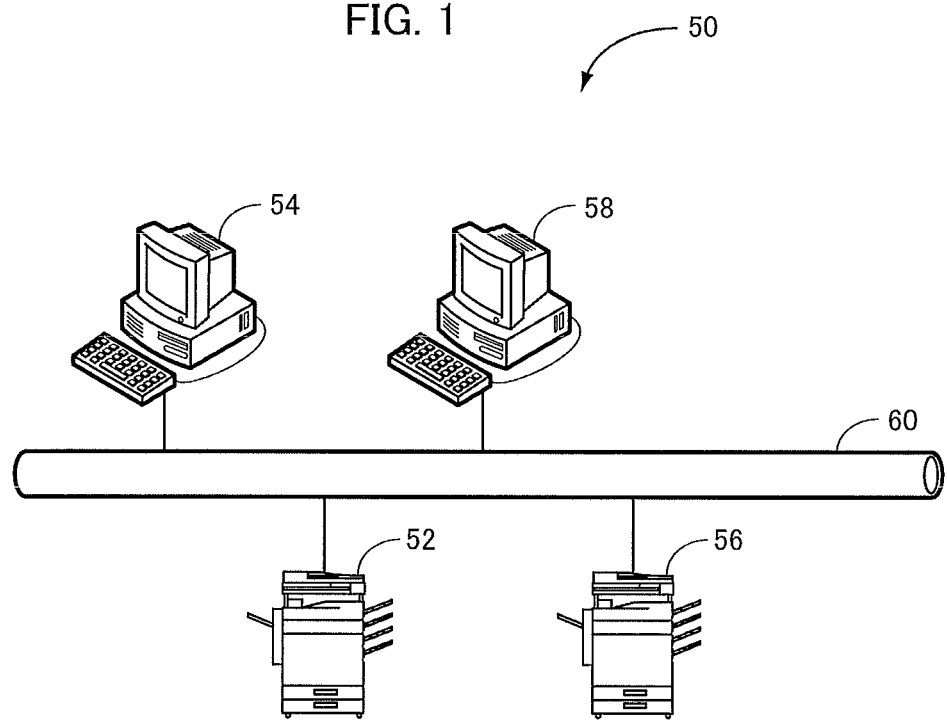
FIG. 1 is a schematic diagram showing an overall configuration of a network system 50 in accordance with a first embodiment of the present invention.

In the following description, the same components are denoted by the same reference characters. Their functions and names are also the same. Therefore, detailed description thereof will not be repeated.

[First Embodiment]

(Network Environment)

Referring to FIG. 1, a network system 50 includes an image processing apparatus 52, which is an electrophotographic type MFP functioning as facsimile, copying machine and printer, connected to an LAN (Local Area Network) 60. Network system 50 further includes a printer apparatus 56 functioning as a printer connected through LAN 60 to an image processing apparatus 52. Network system 50 further includes a terminal 54 such as a PC (Personal Computer) connected through LAN 60 to image processing apparatus 52 and printer apparatus 56. Network system 50 further includes a server 58, connected through LAN 60 to image processing apparatus 52, printer apparatus 56 and terminal 54, for managing image data of documents read by image processing apparatus 52.

(Configuration of Terminal 54)

Figure 2:
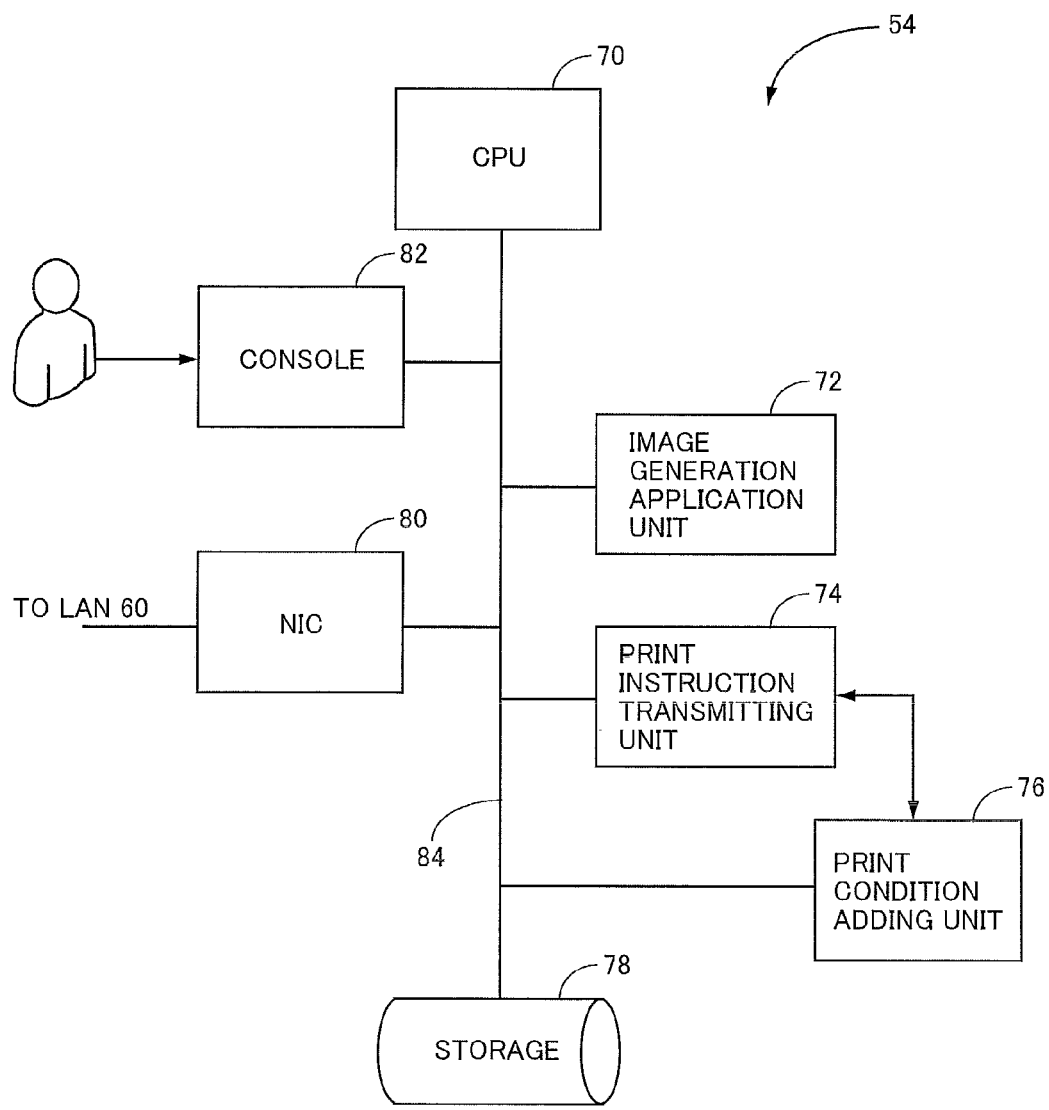
FIG. 2 is a block diagram showing an internal configuration of a terminal 54 shown in FIG. 1.

Referring to FIG. 2, terminal 54 includes: a console 82 including a monitor such as a display, and an operating device such as a mouse and a keyboard operated by the user, for providing an input/output interface for the user; an NIC (Network Interface Card) 80 connected to LAN 60 for transmitting/receiving data to/from other apparatuses through LAN 60; and a storage 78 for storing various pieces of information such as programs.

Terminal 54 further includes: an image generation application unit 72 for executing an application generating image data for the user; a print instruction transmitting unit 74 responsive to a user instruction, for transmitting a print instruction for printing image data generated by image generation application unit 72, through NIC 80 to printer apparatus 56; and a print condition adding unit 76 for adding, when print instruction transmitting unit 74 transmits the print instruction, size of printing paper and print conditions such as double-sided printing, set by the user, to the print instruction.

Terminal 54 further includes: a bus 84 connected to console 82, NIC 80, storage 78, image generation application unit 72, print instruction transmitting unit 74 and print condition adding unit 76; and a CPU (Central Processing Unit) 70 connected to bus 84, for operating various components in terminal 54 and executing programs, for realizing various functions.

(Configuration of Server 58)

Figure 3:
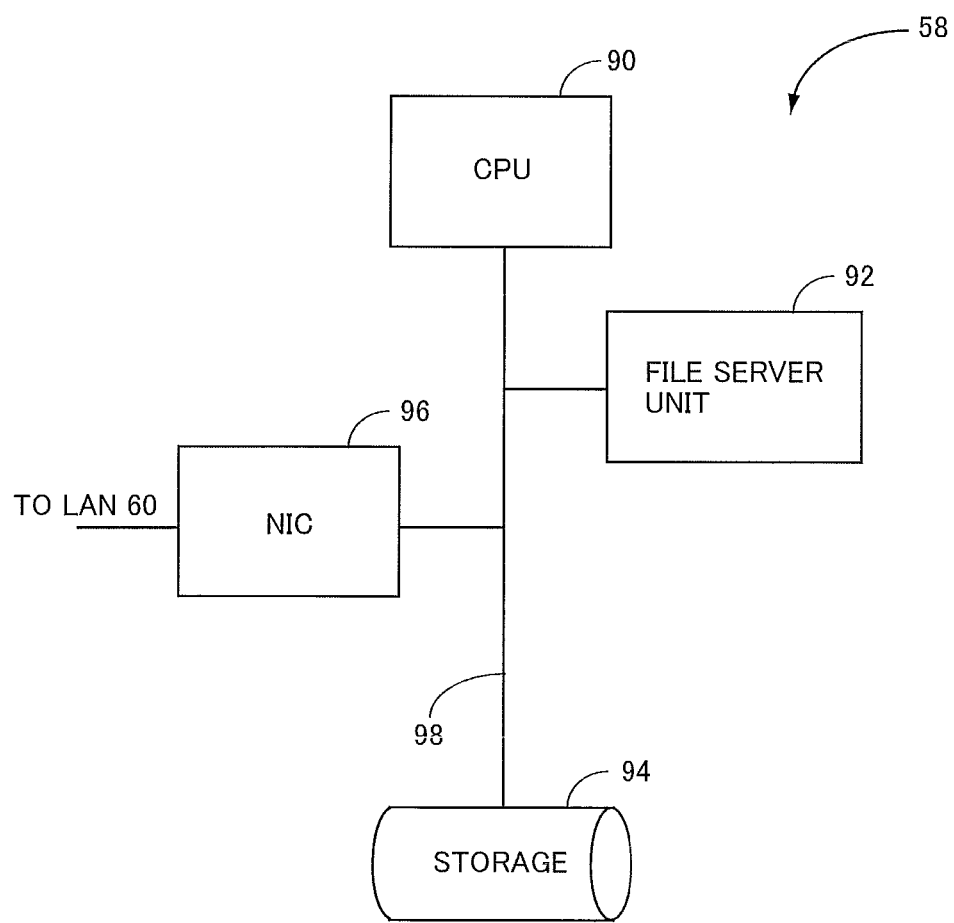
FIG. 3 is a block diagram showing an internal configuration of a server 58 shown in FIG. 1.

Referring to FIG. 3, server 58 includes: an NIC 96 for transmitting/receiving data to/from other apparatuses through LAN 60; a storage 94 for storing various pieces of information such as programs; and a file server unit 92 responsive to reception of image data from other apparatuses through NIC 96, for storing the received image data in storage 94.

Server 58 further includes: a bus 98 connected to NIC 96, storage 94 and file server unit 92; and a CPU 90 connected to bus 98, for operating various components in server 58 and executing programs for realizing various functions.

(Configuration of Printer Apparatus 56)

Figure 4:
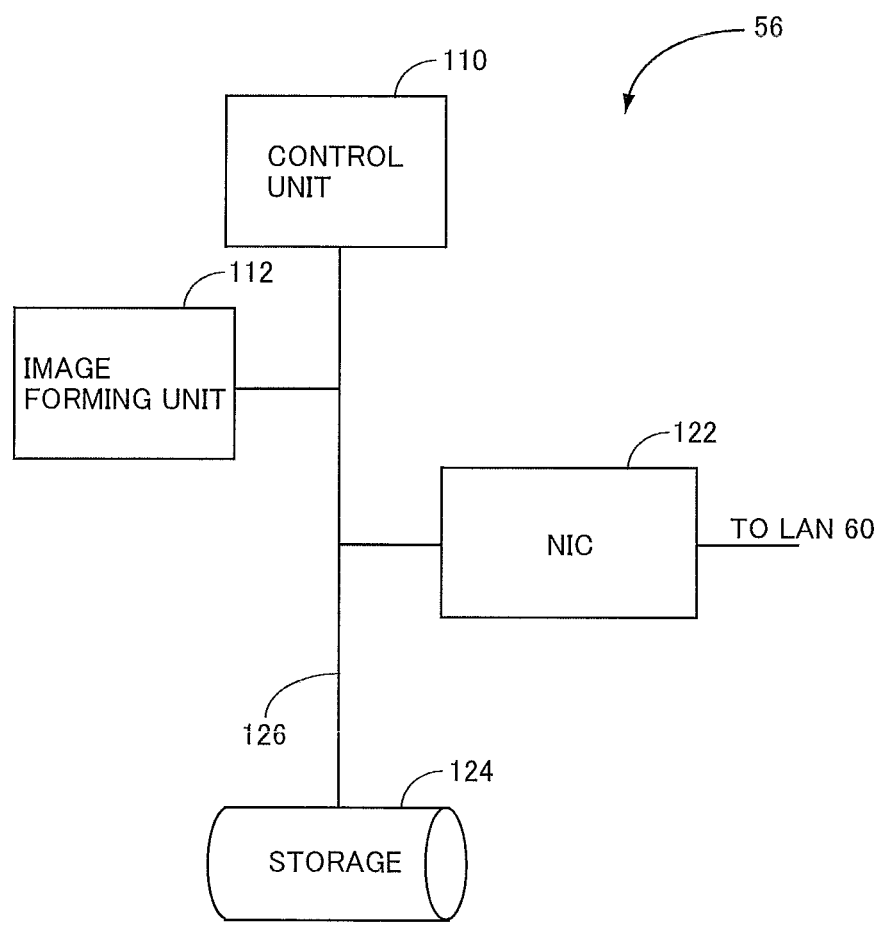
FIG. 4 is a block diagram showing an internal configuration of a printer apparatus 56 shown in FIG. 1.

Referring to FIG. 4, printer apparatus 56 includes: an NIC 122 for transmitting/receiving data to/from other apparatuses through LAN 60; a storage 124 for storing various pieces of information such as programs; and an image forming unit 112 for forming an image based on image data on a sheet of recording paper, in accordance with the print instruction received from terminal 54 (see FIGS. 1 and 2) through NIC 122.

Printer apparatus 56 further includes: a bus 126 connected to NIC 122, storage 124 and image forming unit 112; and a control unit 110 connected to bus 126, for operating various components in printer apparatus 56 and executing programs for realizing various functions.

Control unit 110 is for overall control of printer apparatus 56, and implemented, for example, by a CPU. NIC 122, storage 124 and image forming unit 112 are controlled by control unit 110.

Rectangular sheets of recording paper are set in printer apparatus 56, and in response to reception of a print instruction from terminal 54, image forming unit 112 forms an image on the sheet of recording paper in accordance with the print instruction. When the print instruction has print conditions added thereto, image forming unit 112 prints, with invisible ink, two-dimensional bar-code storing the print conditions, on any of four corners of one surface of the sheet of recording paper. Images other than the two-dimensional bar-code are printed by printer apparatus 56 with normal ink. Here, the invisible ink refers to ink the portion printed with which becomes invisible to human eyes a prescribed time period after printing with the ink is done. In the present embodiment, invisible ink that emits fluorescent light when the portion printed with which is irradiated with ultraviolet ray, is used.

(Configuration of Image Processing Apparatus 52)

Figure 5:
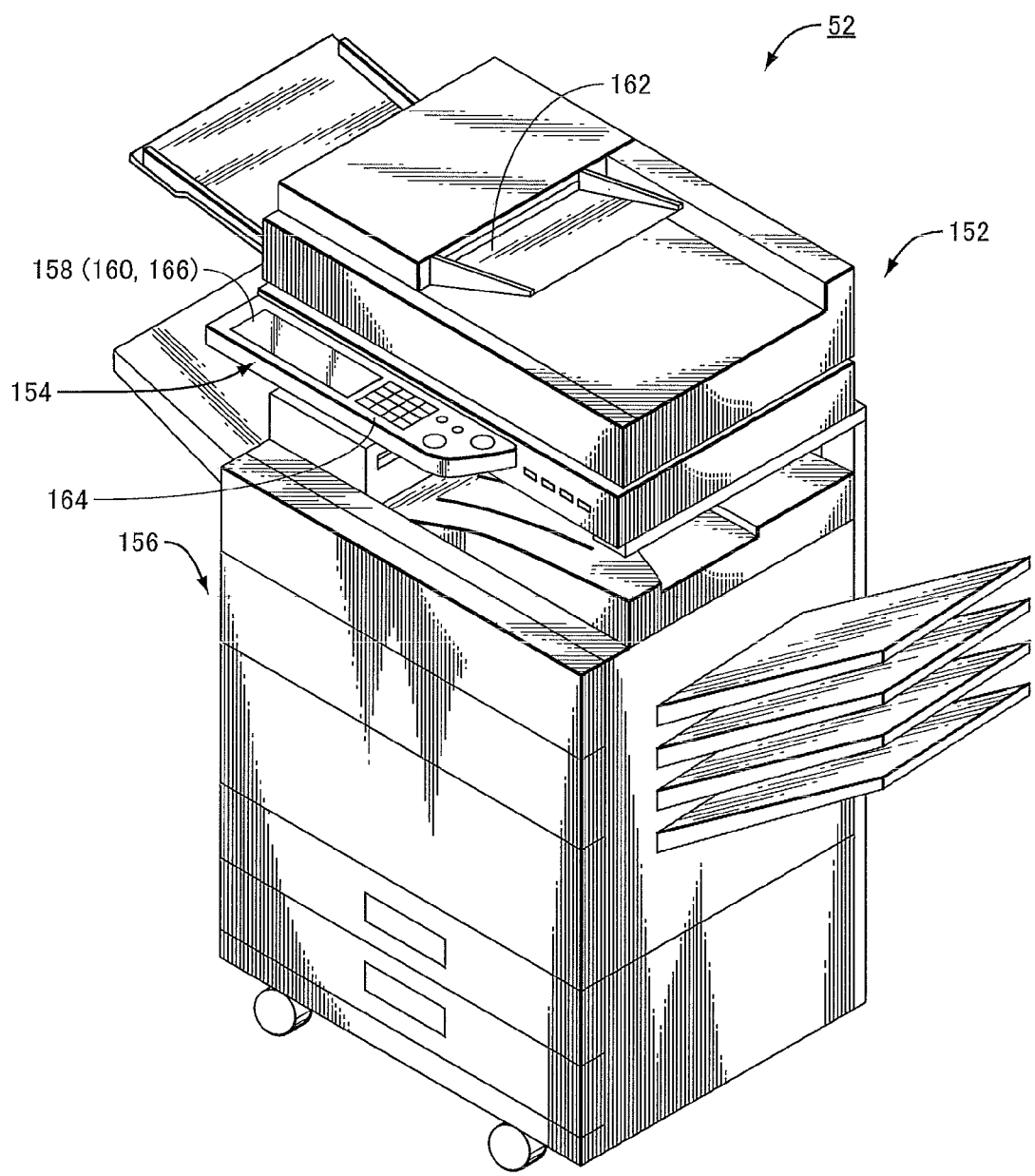
FIG. 5 is a perspective view showing an outer appearance of an image processing apparatus 52 shown in FIG. 1.

Referring to FIG. 5, image processing apparatus 52 includes an image reading unit 152, an operating device 154, and an image forming unit 156.

Here, an operation of image reading unit 152 reading the document image will be described, together with the configuration of image reading unit 152.

Figure 6A:
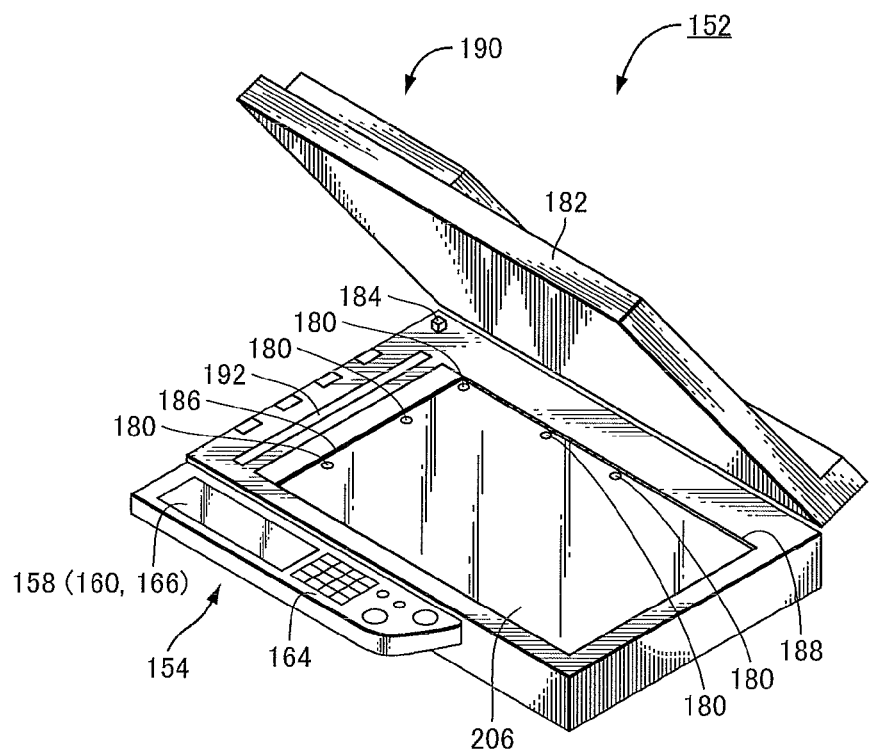
FIG. 6A is a perspective view showing an outer appearance of an image reading unit 152 shown in FIG. 1.
Figure 6B:
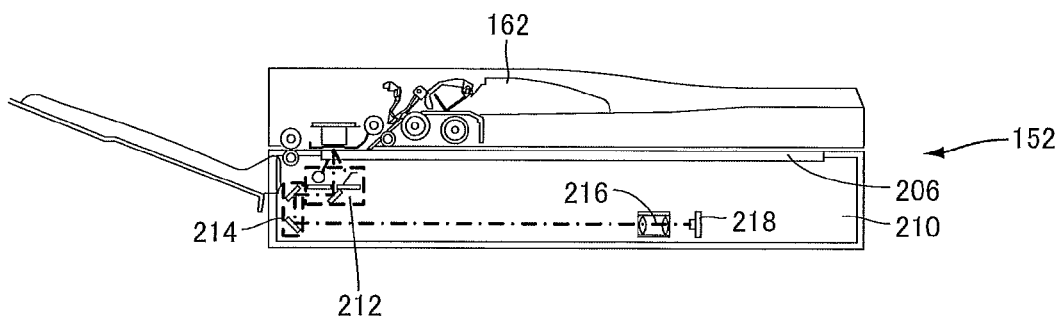
FIG. 6B shows an internal structure of image reading unit 152 shown in FIG. 1.

Referring to FIGS. 6A and 6B, image reading unit 152 includes: a platen glass 206 serving as a document placing table, on which a document is manually placed when the document is to be read; a document cover 182 for pressing the document placed on platen glass 206, and blocking light entering from outside; an ADF (Automatic Document Feeder) 190 arranged on document cover 182 for feeding documents when a plurality of documents placed on a document set tray 162 (see FIG. 5) on document cover 182 are to be read successively; a document reading unit 192 used when the document is read while it is fed by ADF 190; a document cover open/close sensor 184 for detecting whether document cover 182 is opened or closed; and a plurality of reflection type sensors 180 arranged at prescribed positions inside platen glass 206, used for detecting size of the document placed on platen glass 206. Reflection type sensors 180 also serve as document detection sensors for detecting whether a document is placed on platen glass 206 or not.

Referring to FIGS. 5, 6A and 6B, the user sets a document on platen glass 206 such that the image bearing surface faces down. Then, the user operates operating device 154, to instruct document reading.

In response to the instruction, reading unit 210 reads the surface (lower surface) of the document. Specifically, referring to FIG. 6B, reading unit 210 has first and second scanning units 212 and 214. The first and second scanning units 212 and 214 are both moved to and positioned at prescribed positions. An exposure lamp of the first scanning unit 212 emits ultraviolet ray to irradiate the document surface through platen glass 206, and the light reflected from the document is guided by reflection mirrors of the first and second scanning units 212 and 214 to an image forming lens 216. The guided light reflected from the document is collected by image forming lens 216 on a CCD (Charge Coupled Device) 218. In this manner, reading unit 210 forms the image on the document surface on CCD 218, and thus reads the image on the document surface.

The read document image is turned to electronic data in the following manner. The surface of platen glass 206 has a rectangular shape, and a shorter side 186 of the surface is parallel to document reading unit 192. Further, the surface of platen glass 206 has a longer side 188. When the user sets a document on platen glass 206, he/she places the document such that a vertex of the document surface is positioned on an intersection between shorter side 186 and longer side 188 of platen glass 206 and that either a shorter side or longer side of the document surface is in contact with the shorter side 186 of platen glass 206.

When the document is set as described above on platen glass 206 and the user instructs to read the document image, image processing apparatus 52 turns the image of document surface to electronic data such that of the sides of document surface, that side which is in contact with longer side 188 is viewed by the user as the upper side, and of the sides of document surface, that side which is in contact with shorter side 186 is viewed by the user as the right side.

[Hardware Configuration of Image Processing Apparatus 52]

In the following, configurations of image processing apparatus 52 other than those described above will be described.

Figure 7:
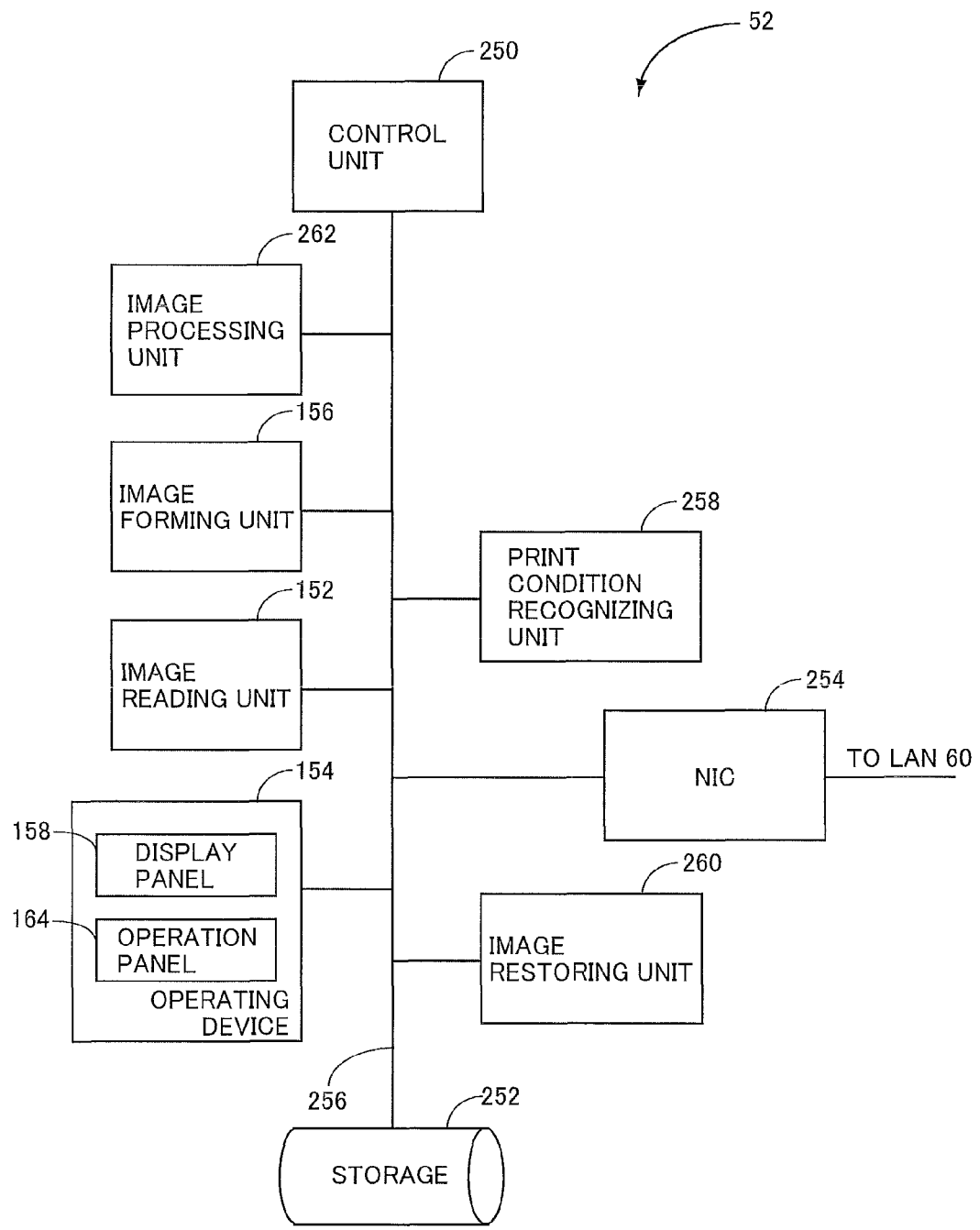
FIG. 7 is a block diagram showing an internal configuration of image reading unit 152 shown in FIG. 1.

Referring to FIG. 7, image processing apparatus 52 includes: image reading unit 152 of which configuration and operation have been described above; an image processing unit 262 performing image processing on image signals read by image reading unit 152 and outputting the result; and an image forming unit 156 for providing a print output, by forming the image output from image processing unit 262 on a sheet of paper.

Image processing apparatus 52 further includes: an NIC 254 for transmitting/receiving data to/from other apparatuses through LAN 60; operating device 154 provided on a front left side of image reading unit 152, used by the user when he/she operates image processing apparatus 52, as shown in FIGS. 5 and 6A:, and a storage 252 for storing various pieces of information such as programs, images read by image reading unit 152, and image data digitally processed by image processing unit 262.

Image processing apparatus 52 further includes: a print condition recognizing unit 258 for analyzing, when a two-dimensional bar-code is included in the image data of a document read by image reading unit 152, print conditions stored in the two-dimensional bar-code; and an image restoring unit 260 for processing the image data read by image reading unit 152, for example, rotating the data to a direction easily viewable by the user, in accordance with the print conditions analyzed by print condition recognizing unit 258.

Image processing apparatus 52 further includes: a bus 256 connected to image reading unit 152, image processing unit 262, image forming unit 156, NIC 254, operating device 154, storage 252, print condition recognizing unit 258 and image restoring unit 260; and a control unit 250 connected to bus 256, executing a prescribed control program for controlling various components of image processing apparatus 52 and realizing general functions of the image forming apparatus.

Control unit 250 is for overall control of image processing apparatus 52, and implemented, for example, by a CPU. Image reading unit 152, image processing unit 262, image forming unit 156, NIC 254, operating device 154, storage 252, print condition recognizing unit 258 and image restoring unit 260 are controlled by control unit 250.

(Configuration of Operating Device 154)

Figure 8:
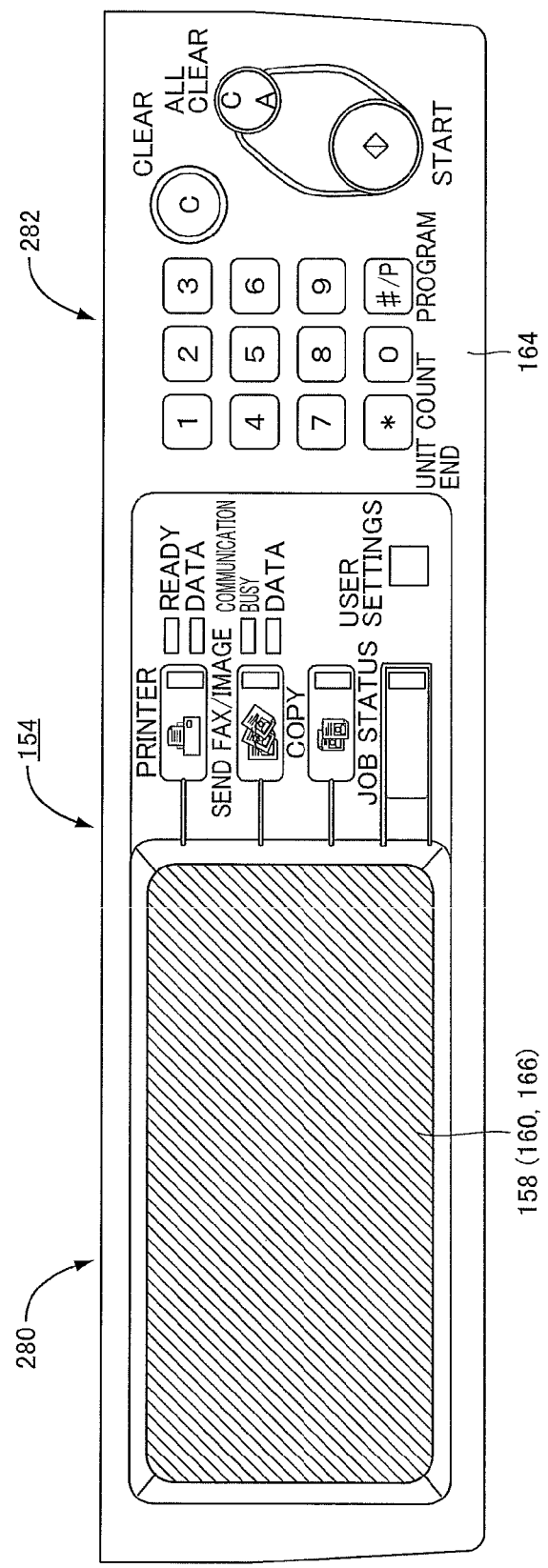
FIG. 8 is a plan view of an operating device 154 shown in FIG. 5.

Referring to FIGS. 7 and 8, operating device 154 includes: a flat operation panel 164 arranged on a right side area 282 on the surface of operating device 154, provided with ten keys and hard keys as various other operation buttons; and a display panel 158 arranged from the center to the left side area 280 of operating device 154, formed of a small-sized touch-panel liquid crystal display device. Operation panel 164 and display panel 158 are held in one housing, and operating device 154 is formed as an integral part as a whole.

Specifically referring to FIG. 8, display panel 158 includes: a display unit 160 providing GUI (Graphic User Interface); and an operation unit 166 having a scanner control function, formed of the touch panel laminated on display unit 160, operated by the user and outputting a signal corresponding to the contents of operation.

Operation unit 166 operates in the similar manner as a common touch panel, except that it has a scanner control function. Specifically, control unit 250 displays a window having various software keys arranged therein, on display unit 160 according to the situation. When the user touches a software key, coordinates representing the touched position are transmitted by operation unit 166 to control unit 250. Control unit 250 determines what operation is done by the user, based on the position of software key displayed on display unit 160 and the input coordinates. If the operator operates a hardware key, not shown, a specific key code is transmitted from the hardware key to control unit 250. Control unit 250 determines the user's operation in accordance with the key code.

When the user of terminal 54 (see FIGS. 1 and 2) generates image data using image generation application unit 72 (see FIG. 2), the application allows the user to generate an image of a rectangular shape. The longer side of the rectangle is displayed on the display device to be viewed by the user in vertical or horizontal layout.

When the user generates an image on the application and instructs printing of the image data, a setting window for setting print conditions (as will be described later with reference to FIG. 9) is displayed on a display device, not shown, of terminal 54. On the setting window, the user may set the number of copies to be printed, N-up number representing whether or not N-up printing is to be done, N-up arrangement direction, which will be described later, size of printing paper and resolution of image printing. In the present embodiment, the resolution is defined by the unit of dpi (dot per inch).

When N-up printing is done with N being 4 or larger, images of a plurality of pages are arranged and printed in a plurality of rows and columns on one document. The N-up arrangement direction is for determining the order of arranging image data of a plurality of pages on the document when N is 4 or larger, and the order is determined either by the first arrangement method or the second arrangement method described in the following.

According to the first arrangement method, first, images are arranged in order from the left to the right on the first row of the document. Next, on the second row, images are arranged in order from the left to the right. Thereafter, in the similar manner, the images are arranged from the left to the right on each of the third and the following rows, repeatedly to the last row.

According to the second arrangement method, first, images are arranged in order from the top to the bottom on the first column of the document. Next, on the second column, images are arranged in order from the top to the bottom. Thereafter, in the similar manner, the images are arranged from the top to the bottom on each of the third and the following columns, repeatedly to the last column.

Image printing resolution is a condition set for designating the resolution when printer apparatus 56 prints an image in accordance with the print instruction. When the image printing resolution is designated, printer apparatus 56 prints with the resolution.

Figure 9:
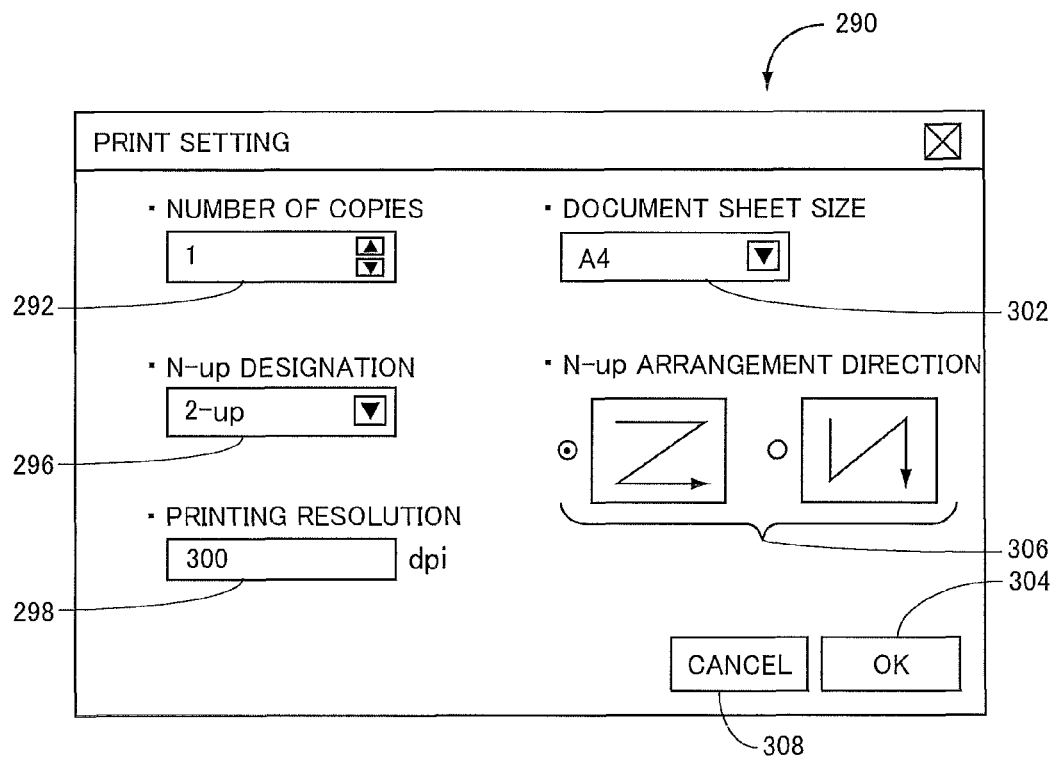
FIG. 9 shows an example of a setting window for inputting print conditions.

Referring to FIG. 9, setting window 290 includes: a pull-down menu 292 for inputting an integer not smaller than 1 for designating the number of copies to be printed; a pull-down menu 296 for inputting whether or not N-up printing is to be done; a text box 298 for inputting the image printing resolution; a pull-down menu 302 for inputting the size of printing paper; a radio button 306 for setting the arrangement for N-up printing, either to the first arrangement method or the second arrangement method; an OK button 304; and a cancel button 308 for cancelling the setting of print conditions.

It is possible to designate the size of recording paper to A3, A4, A5 or the like by pull-down menu 302. Though not shown, it is possible for the user to set the image size when the image was formed by the application (the size to be restored after scanning), at the time of transmitting the print instruction.

When the user presses OK button 304, terminal 54 adds the print conditions set on setting window 290 to the print instruction, and transmits the print instruction to printer apparatus 56.

When the user presses cancel button 308, terminal 54 erases the setting window 290 from the display screen of a display device, not shown.

Figure 10:
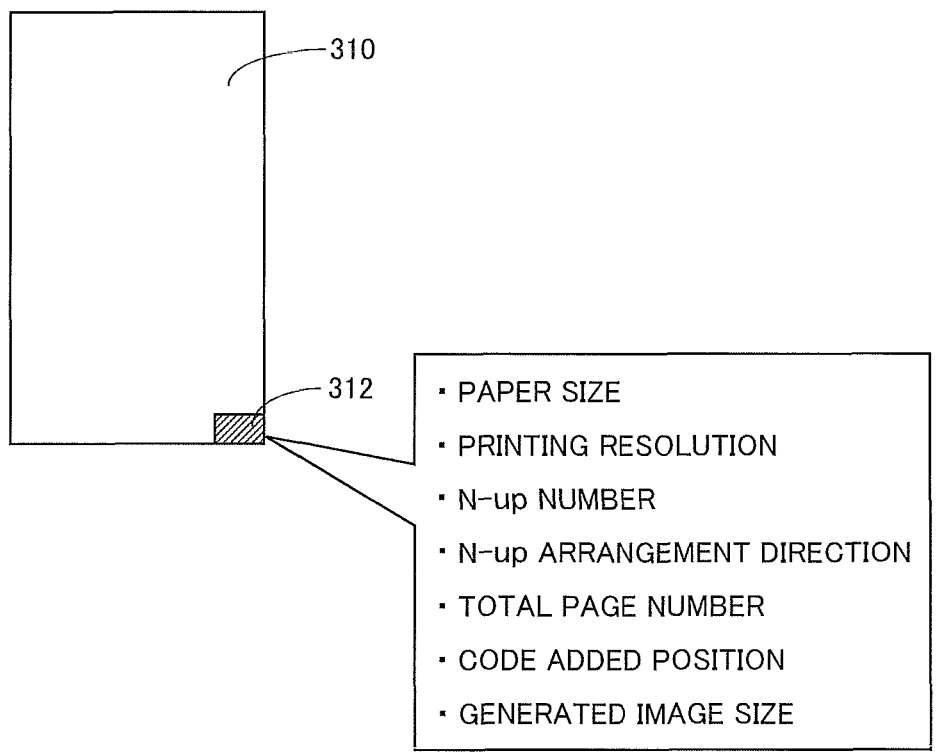
FIG. 10 shows pieces of information stored in the two-dimensional bar-code on the document.

FIG. 10 shows an example of a document printed by printer apparatus 56 in accordance with the print instruction with the print conditions added. Referring to FIG. 10, a document 310 is printed by printer apparatus 56. At a corner on the surface of document 310, a two-dimensional bar-code 312 storing print conditions is provided. Though two-dimensional bar-code 312 is represented by a hatched portion in FIG. 10, printer apparatus 56 prints the two-dimensional bar-code with invisible ink and, therefore, two-dimensional bar-code 312 is invisible to the user's eyes.

Two-dimensional bar-code 312 stores the paper size, image printing resolution, N-up number and the arrangement direction for N-up printing, input by the user through the setting window described above, as well as the image size generated by the application (hereinafter referred to as "generated image size"), the total number of pages collected on the recording paper at the time of N-up printing, and information related to a position where the two-dimensional bar-code is printed on the surface of the document (hereinafter referred to as "code added position").

In "N-up ARRANGEMENT DIRECTION" of two-dimensional bar-code 312, either the "first arrangement direction" or the "second arrangement direction" is stored.

In "PAPER SIZE," lengths of longer and shorter sides of the image generated by the application are stored.

"N-up NUMBER" stored in the two-dimensional bar-code and the total number of pages are not always the same. By way of example, when the images generated by the application contains 5 pages and these images are to be 9-up printed, the N-up number is 9, and the total number of pages of the images collected on one sheet of recording paper is 5.

Generally, when a document image has a rectangular shape, the image is displayed on a display device such that two sides parallel to each other are viewed by the user as being substantially vertical. With the image displayed in this manner, four vertexes of the image are recognized by the user as positioned at "lower right," "upper right," "lower left" and "upper left" points.

"CODE ADDED POSITION" represents information indicating at which of the "lower right," "upper right," "lower left" and "upper left" corners the two-dimensional bar-code is added, when the image is displayed on the display device. In "CODE ADDED POSITION," any one of "lower right," "upper right," "lower left" and "upper left" is stored. The manner how the code added position is determined will be described later.

(Software Configuration)

A user of terminal 54 generates image data utilizing an application provided by image generation application unit 72. In the present embodiment, the image data is generated to have a rectangular shape. When the user makes an operation of transmitting a print instruction to print the image data to terminal 54, terminal 54 displays a setting window 290, asking an input of print conditions, on a display device, not shown.

Figure 11:
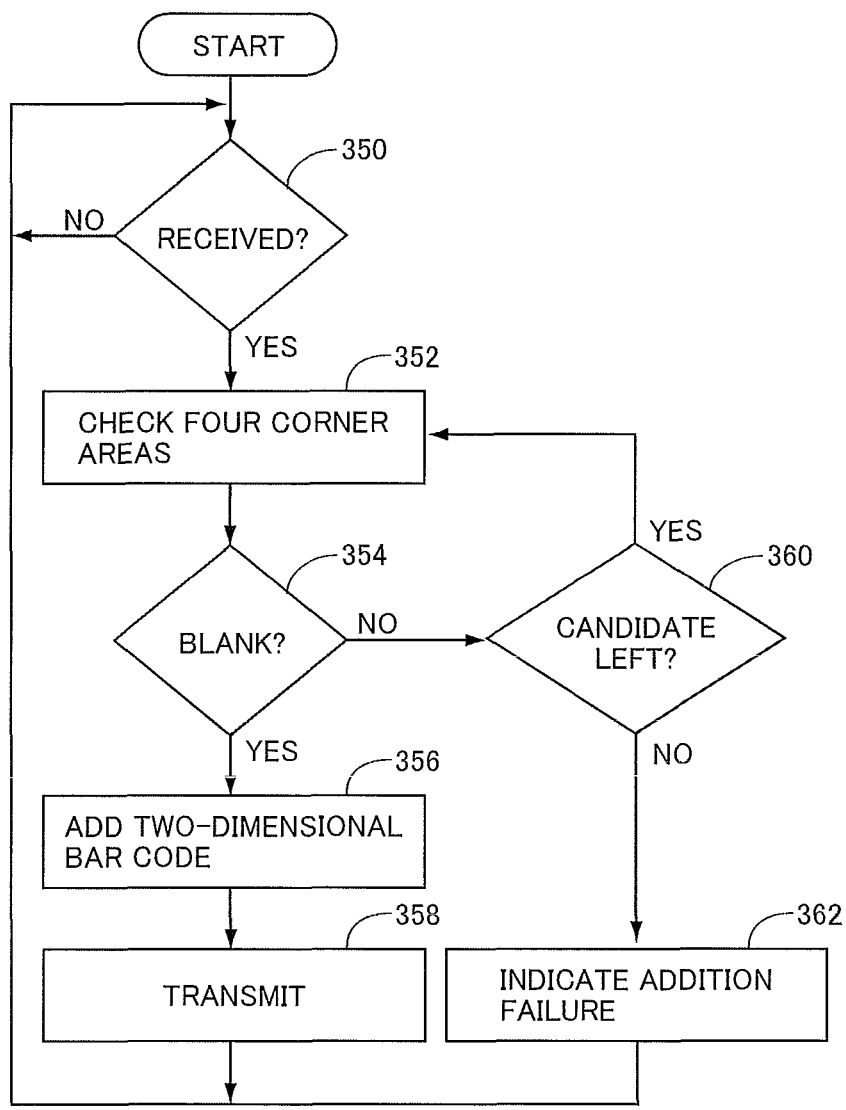
FIG. 11 is a flowchart representing a control structure of a program executed by a CPU 70 shown in FIG. 2.

FIG. 11 is a flowchart representing a control structure of a program controlling print instruction transmitting unit 74, executed by CPU 70 of terminal 54 when the above-described application is used by the user. Referring to FIG. 11, the program includes: a step 350 of waiting until the user presses OK button 304 on setting window 290 shown in FIG. 9; and a step 352 executed if OK button 304 is pressed at step 350, of checking whether or not any corner of image data generated by the user is blank.

If the N-up printing has been set by the user through the setting window, at step 352, whether or nota corner of the image after collecting the images of a plurality of pages is blank is determined.

The program further includes a step 354, following step 352, of determining whether or not the corner checked at step 352 is blank, and branching the control flow depending on the result of determination.

The program further includes: a step 356, executed if it is determined at step 354 that the corner checked at step 352 is blank, of drawing the two-dimensional bar-code storing the print conditions and the like input through the setting window, on the corner; and a step 358, following step 356, of transmitting the print instruction of the image data to printer apparatus 56 and returning the control flow to step 350. If it is determined at step 360 that unchecked corner remains among the corners of the image data, the control returns to step 352.

At step 356, each of the print conditions is specifically determined in the following manner. At step 356, determination is made as to which one of "lower right," "upper right," "lower left" and "upper left" corners on the display device is the corner determined to be blank at step 352, and depending on the result of determination, character sequence of "lower right," "upper right," "lower left" or "upper left" is stored in "code added position". "Total number of pages" stores the number of pages of the image generated by the user utilizing the application. In "image size" stored in the two-dimensional bar-code, the lengths of longer and shorter sides of the image data when the image data is displayed in 100% magnification on the display device are stored.

The program further includes: a step 360, executed if it is determined at step 354 that the corner checked at step 352 is not blank, of determining whether there remains any corner that has not been checked, among the corners of the image data, and branching control flow depending on the result of determination; and a step 362, executed if it is determined at step 360 that there is no corner left unchecked among the corners of the image data, of displaying a message that printing of two-dimensional bar-code is impossible on the display device, and returning the control flow to step 350.

Figure 12:
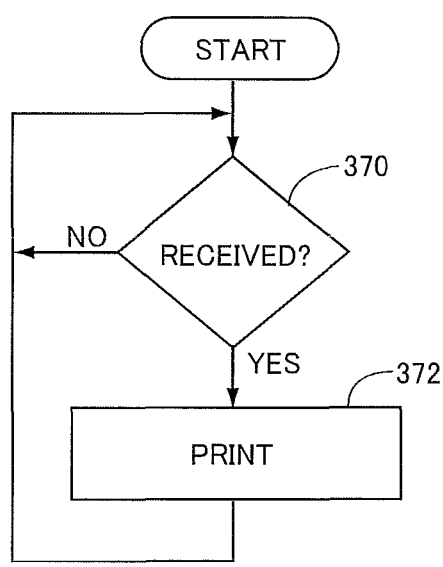
FIG. 12 is a flowchart representing a control structure of a program executed by a control unit 110 shown in FIG. 4.

FIG. 12 is a flowchart representing a control structure of a program controlling image forming unit 112, executed by control unit 110 of printer apparatus 56, when printer apparatus 56 is activated. Referring to FIG. 12, the program includes: a step 370 of waiting until a print instruction is received from terminal 54; and a step 372, executed if the print instruction is received at step 370 and if the two-dimensional bar-code is drawn on the image data, of printing the two-dimensional bar-code with invisible ink, and printing the image or images other than the two-dimensional bar-code with normal ink on a sheet of recording paper, and returning the control flow to step 370.

If printing is to be done on a plurality of sheets of paper, the two-dimensional bar-code may be printed only on the first page or the two-dimensional bar-code is printed on all pages, at step 372. Which method is used for printing the two-dimensional bar-code is determined in advance by the user.

Figure 13:
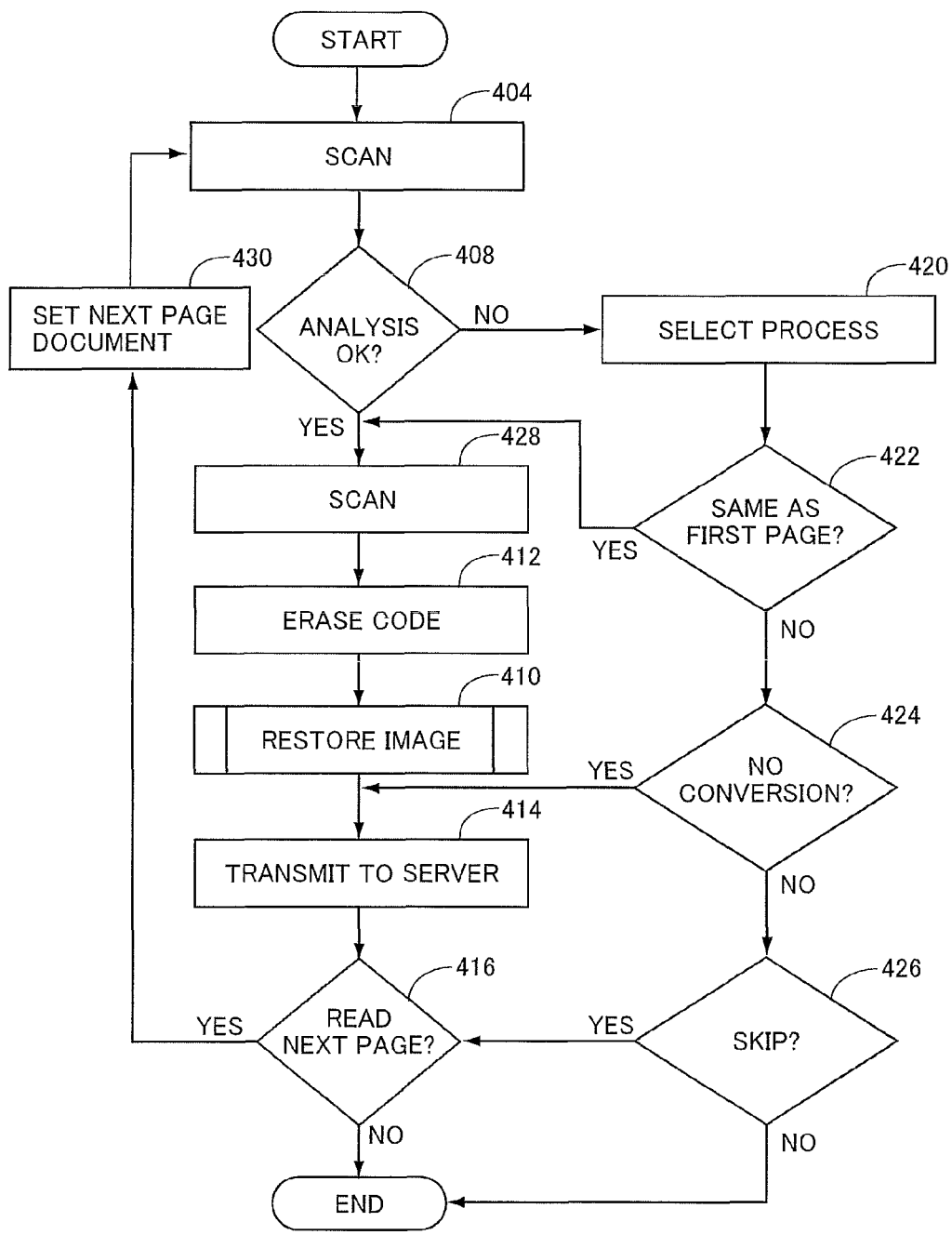
FIG. 13 is a flowchart representing a control structure of a program executed by a control unit 250 shown in FIG. 7.

FIG. 13 is a flowchart representing a control structure of a program executed by control unit 250 of image processing apparatus 52, when the instruction is given by the user. The user sets a document that has been printed by printer apparatus 56, on platen glass 206. The user operates operating device 154 and thereby instructs reading of the document image. Referring to FIG. 13, the program includes: a step 404 of causing image reading unit 152 to read the document image with a default resolution; and a step 408, following step 404, of searching for four corners of the read image data, determining whether or not drawing of two-dimensional bar-code has been confirmed, and branching control flow depending on the result of determination.

At step 408, if the two-dimensional bar-code has not been printed on the document by printer apparatus 56, or if the two-dimensional bar-code has been printed but it cannot be recognized as two-dimensional bar-code because of poor image quality, it is determined that drawing of two-dimensional bar-code has not been confirmed.

The program further includes: a step 428, executed if it is recognized at step 408 that the two-dimensional bar-code has been drawn, and the image printing resolution is stored in the two-dimensional bar-code, of comparing the reading resolution and the printing resolution, and performing a process of lowering resolution or re-scanning if the reading resolution exceeds the printing resolution; a step 412, following step 428, of erasing the two-dimensional bar-code from the image; and a step 410, following step 412, of executing the image restoring process, which will be described later, in accordance with the information stored in the two-dimensional bar-code.

In the image restoring process, if the read document image is a N-up printed image, a process of dividing the image and/or a process of rotating the image for easier viewing by the user are executed.

The program further includes: a step 414, following step 410, of transmitting the restored image data to server 58; and a step 416, following step 414, of determining whether or not reading of a document of the next page has been instructed by the user, and branching control flow depending on the result of determination. If reading of the next document is not instructed by the user at step 416, the program ends.

The program further includes a step 430, executed if reading of the next page document is instructed by the user at step 416, of allowing the user to set the document of the next page, and returning the control flow to step 404.

The program further includes a step 420, executed if drawing of a two-dimensional bar-code cannot be confirmed at step 408, of asking the user to select any of the following contents of processing.

Assume that printer apparatus 56 formed images on a plurality of sheets of the recording paper in accordance with one print instruction. In that case, it is possible that the two-dimensional bar-code is printed only on the first page.

In that case, at step 420, the user selects whether the images are to be restored under the same print conditions as stored in the two-dimensional bar-code printed on the first page, or the read images are to be stored as they are (that is, stored as 1-up images, the read image size is unchanged, and the read image or images are not rotated), or to skip to a process for the next document without performing any process on the currently read document.

The program further includes: a step 422, following step 420, of determining whether the user selected to restore the images under the same print conditions as stored in the two-dimensional bar-code printed on the first page at step 420, and branching control flow depending on the result of determination; a step 424 of determining, if it is determined at step 422 that the user has not selected to restore the images under the same print conditions as stored in the two-dimensional bar-code printed on the first page, whether the user selected to store the read images as they are, and branching control flow depending on the result of determination; and a step 426 of determining, if it is determined at step 424 that the user has not selected to store the read images as they are, whether the user selected to skip to a process for the next document without performing any process on the currently read document, and branching control flow depending on the result of determination. If it is determined at step 422 that the user selected to restore the images under the same print conditions as stored in the two-dimensional bar-code printed on the first page, the control proceeds to step 428. If it is determined at step 424 that the user selected to store the read images as they are, the control proceeds to step 414. If it is determined at step 426 that the user selected to skip to a process for the next document without performing any process on the currently read document, the control proceeds to step 416. If it is determined at step 426 that the user has not selected to skip to a process for the next document without performing any process on the currently read document, the program ends.

Receiving the image data transmitted at step 414, file server unit 92 of server 58 stores the data in storage 94.

Figure 14:
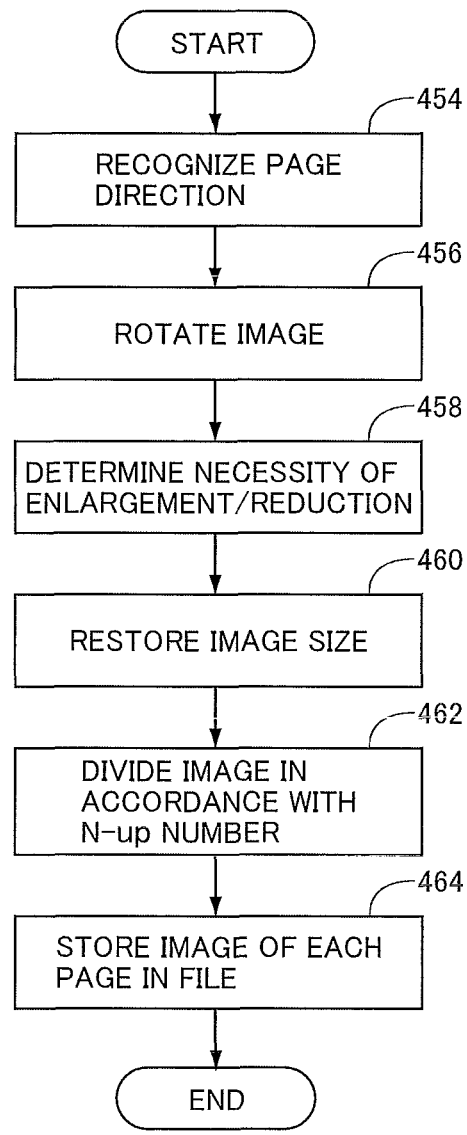
FIG. 14 is a detailed flow of a step 410 shown in FIG. 13.

FIG. 14 is a detailed flow of step 410 shown in FIG. 13. Referring to FIG. 14, the routine includes: a step 454 of recognizing the direction of read image by comparing "code added position" stored in the two-dimensional bar-code and the position of the corner on which the two-dimensional bar-code is printed on the read image; and a step 456, following step 454, of rotating the image in accordance with the direction recognized at step 454.

At step 456, specifically, the image is rotated in the following manner.

If "lower right" is stored as the code added position and the two-dimensional bar-code of the read image is positioned on the lower right, upper right, lower left or upper left position of the image, the image data is rotated by 0° (no rotation), 90° in the clockwise direction, 90° or 180° in the counterclockwise direction, respectively.

If "upper right" is stored as the code added position and the two-dimensional bar-code of the read image is positioned on the lower right, upper right, lower left or upper left position of the image, the image data is rotated by 90° in the counterclockwise direction, 0°, 180° or 90° in the clockwise direction, respectively.

If "lower left" is stored as the code added position and the two-dimensional bar-code of the read image is positioned on the lower right, upper right, lower left or upper left position of the image, the image data is rotated by 90°, 180° in the clockwise direction, 0° or 90° in the counterclockwise direction, respectively.

If "upper left" is stored as the code added position and the two-dimensional bar-code of the read image is positioned on the lower right, upper right, lower left or upper left position of the image, the image data is rotated by 180°, 90° in the counterclockwise direction, 90° in the clockwise direction, or 0°, respectively.

The program further includes: a step 458, following step 456, of confirming whether or not the image size stored in the two-dimensional bar-code is the same as the size of the read image and determining whether enlargement or reduction of the image is necessary; and a step 460, following step 458, executed if enlargement or reduction of the image is necessary, of enlarging or reducing the image data by changing the resolution of image data.

The image size generated by the application on terminal 54 is not always the same as the size of recording paper designated by the user at the time of print instruction. Therefore, at step 460, a process for returning the image size to the size of the image generated by the application is performed. Specifically, at step 460, the read image is enlarged or reduced such that the lengths of longer and shorter sides of the read image become equal to the lengths of longer and shorter sides stored in the two-dimensional bar-code by changing the resolution of the data. In the present embodiment, the number of dots of the image data is fixed, and the image size is determined by the dpi of the image data. Further, as the viewer for viewing the image data refers to the dpi of the display, the dot size when the image is displayed is determined.

In the following, it is assumed that n is an integer larger than 0. Referring to FIG. 15, in fit-page printing, resolution ratio when the size is changed from Bn to A(n−1) size is 1.15. Therefore, if a document image of Bn size is to be restored to the image of A(n−1) size, what is necessary is to multiply the original resolution by the resolution ratio.

When the size is to be restored from An size to Bn size, the resolution ratio is 1.22. Further, when the size is to be restored from Bn size to B(n−1) size, or from An size to A(n−1) size, the resolution ratio is 1.41.

Again referring to FIG. 14, the program further includes: a step 462, following step 460, of dividing the image in accordance with the N-up number stored in the two-dimensional bar-code and restoring the size; and a step 464, following step 462, of storing each image in storage and ending the routine.

At step 462, specifically, the following process is performed.

FIG. 16 is a table showing pieces of information for restoring images in accordance with N-up numbers, when an N-up printed document is divided. Referring to FIG. 16, the table shows, for each N-up number, the information as to whether or not rotation of divided images is necessary after the image is divided after step 460, information of the number of divisions in the shorter side and longer side of the recording paper when N-up printing was done, and information of the ratio of resolution when the N-up printed recording paper is read and the resolution when the divided image is restored to the original size.

The method of dividing the N-up printed document image for any N-up number has been conventionally well known and, therefore, detailed description will not be given here.

In the 2-up, 6-up and 8-up printed documents, originally, images are printed with shorter side of each image formed by the application arranged parallel to the longer side of the recording paper. When rotated at step 454, the upper side of the image formed by the application is arranged to be parallel to the lateral side of the rotated image. Therefore, when these N-up printed documents are divided, the image is rotated by 90° before division.

To which direction the image is to be rotated by 90° is determined automatically so that the image is displayed erected upright to the user on the display device.

At step 460, after the image is divided and rotated, each of the divided image is enlarged or reduced such that the lengths of longer and shorter sides of the image become equal to the lengths of longer and shorter sides stored in the two-dimensional bar-code, respectively.

The divided image data is transmitted to server 58, and viewed by a PDF (Portable Document Format) reader. When a PDF file is to be formed from the image data, it is necessary to set the resolution before formation. Setting of resolution is to generate the PDF file later.

Further, the divided image data may be transmitted to server 58 and viewed by a TIFF (Image File Format) viewer. When TIFF viewer is used, additional information is given to the image, so as to enable display of the image in a size expected by the viewer. In the present embodiment, resolution is set as the additional information.

(Operation)

Referring to FIGS. 1 to 14, network system 50 in accordance with the present embodiment having the structure as described above operates in the following manner.

The user generates an image by an application for generating images, on terminal 54. After generating the image, the user gives an instruction to terminal 54 to print the image. In response to the instruction, terminal 54 displays setting window 290 on the display device. The user inputs print conditions on the setting window 290 and presses OK button 304.

When OK button 304 is pressed, terminal 54 checks whether or not any corner of the image to be printed on the document is blank (step 352 shown in FIG. 11). If four corners of the image to be printed are not blank, terminal 54 displays a message indicating that printing of two-dimensional bar-code is impossible, on the display device (step 362 shown in FIG. 11).

If a blank corner is found (YES at step 354 shown in FIG. 11), terminal 54 draws a two-dimensional bar-code storing print conditions on the corner (step 356 shown in FIG. 11). Then, terminal 54 transmits to printer apparatus 56 a print instruction, instructing printing of the image data (step 358 shown in FIG. 11).

Receiving the print instruction from terminal 54 (YES at step 370 shown in FIG. 12), printer apparatus 56 forms images on recording paper in accordance with the print instruction (step 372 shown in FIG. 12). It is noted here that if the two-dimensional bar-code is drawn on the image, the two-dimensional bar-code is printed with invisible ink on the recording paper, and images other than the two-dimensional bar-code are printed with normal ink.

The user sets the first page of the document printed by printer apparatus 56 on platen glass 206 of image processing apparatus 52, and operates operating device 154 to give an instruction of image reading.

Image processing apparatus 52 performs the following process on the first page of the document.

Image processing apparatus 52 reads the set document with a prescribed resolution (step 404 shown in FIG. 13). Image processing apparatus 52 searches for four corners of the read image. If it is confirmed that a two-dimensional bar-code is drawn (YES at step 408 shown in FIG. 13) and the resolution for image reading is designated in the two-dimensional bar-code, image processing apparatus 52 reads the document image again with the designated resolution (step 428 shown in FIG. 13). Image processing apparatus 52 erases the two-dimensional bar-code from the read image (step 412 shown in FIG. 13). After erasing the two-dimensional bar-code, image processing apparatus 52 performs the following process on the read image.

Image processing apparatus 52 compares the value stored as the code added position and the position where the two-dimensional bar-code is printed in the read image, and if necessary as a result, rotates the read image (steps 454 and 456 shown in FIG. 14). Image processing apparatus 52 compares the image size stored in the two-dimensional bar-code with the size of the read image, and determines whether it is necessary to enlarge or reduce the image (step 458 shown in FIG. 14). Image processing apparatus 52 enlarges or reduces the size of the read image such that the size becomes the same as the image size stored in the two-dimensional bar-code (step 460 shown in FIG. 14). Thereafter, in accordance with the N-up number stored in the two-dimensional bar-code, image processing apparatus 52 divides and enlarges the image. If the document is a 2-up, 6-up or 8-up printed, the image is rotated by 90° so that the divided and enlarged image is displayed erected upright on the display device, in accordance with respective N-up number (step 462 shown in FIG. 14).

Image processing apparatus 52 stores the divided image data in storage 252. Image processing apparatus 52 calculates the resolution in accordance with the N-up number, and adds the calculated resolution and the size stored in the two-dimensional bar-code to the image data.

Image processing apparatus 52 transmits the divided image data to server 58 (step 414 shown in FIG. 13).

Receiving the image data, file server unit 92 of server 58 stores the data in storage 94.

It is possible for other terminals connected to LAN 60 to access to server 58 and view the image data stored in storage 94.

If there is a user instruction to set the next page of the document (YES at step 416 shown in FIG. 13), image processing apparatus 52 allows the user to set the next page of the document (step 430 shown in FIG. 13).

Image processing apparatus 52 reads the newly set document image with a prescribed resolution. If drawing of the two-dimensional bar-code on the next page of the document cannot be confirmed (NO at step 408 shown in FIG. 13), image processing apparatus 52 asks the user to select either to restore the images under the same print conditions as stored in the two-dimensional bar-code printed on the first page, to store the read images as they are, or to skip to a process for the next document without performing any process on the currently read document.

If the user selects none of these at step 420 (NO at step 422, NO at step 424 and NO at step 426 of FIG. 13), image processing apparatus 52 ends the process.

At step 420, if the user selects to restore the images under the same print conditions as stored in the two-dimensional bar-code printed on the first page (YES at step 422 shown in FIG. 13), image processing apparatus 52 executes the process following step 428.

At step 420, if the user selects to store the read images as they are (YES at step 424 shown in FIG. 13), image processing apparatus 52 executes the process following step 414.

At step 420, if the user selects to skip to a process for the next document without performing any process on the currently read document (YES at step 426 shown in FIG. 13), image processing apparatus 52 executes the process following step 416.

Figure 17A:
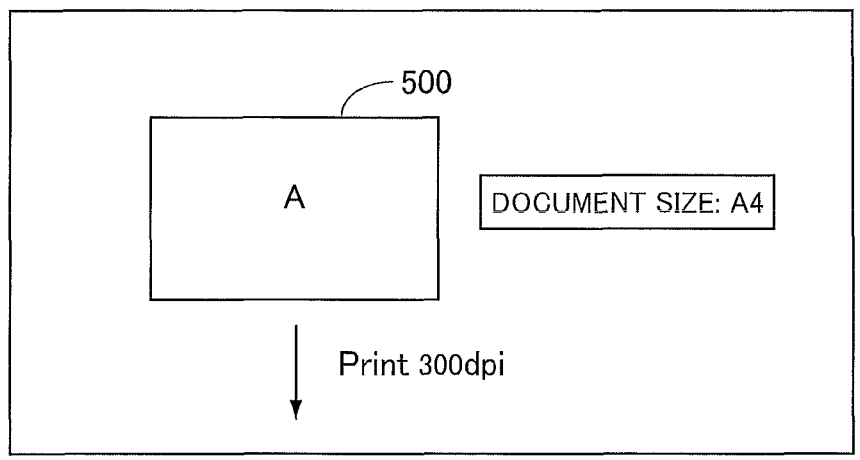
FIGS. 17A to 17C represent a manner how an image is restored.

FIG. 17A shows an image 500 generated by the user on the application of terminal 54. Referring to FIG. 17A, a character "A" is drawn on image 500. When image 500 is printed by printer apparatus 56, a two-dimensional bar-code is printed at a lower right portion of image 500, and "lower right" is stored in the "code added position" of the two-dimensional bar-code. It is assumed that the document size is smaller than the size of image 500.

It is assumed that the user sets the image 500 with its lower and right sides in contact with shorter side 186 and longer side 188 of platen glass 206.

Figure 17B:
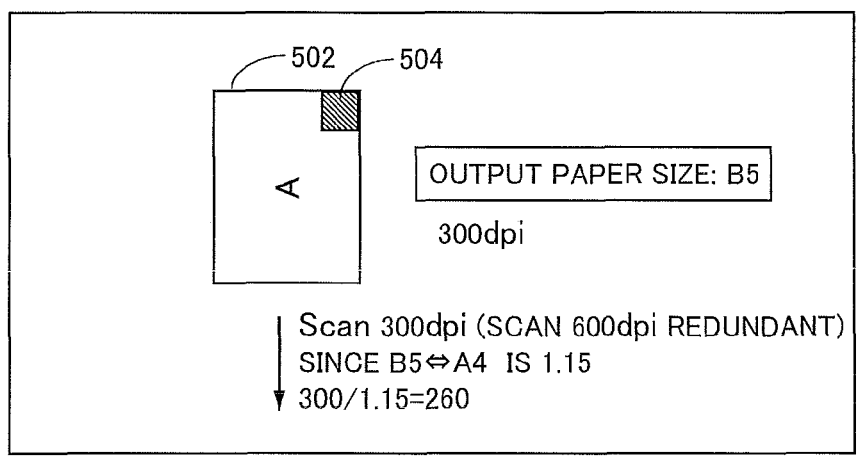

FIG. 17B shows an example of the image data read by image reading unit 152, when the document of image 500 is set in such a manner. Referring to FIG. 17B, the side corresponding to the upper side of image 500 is positioned as the left side of image data 502, and the side corresponding to the right side of image 500 is positioned as the upper side of image data 502. Further, two-dimensional bar-code 504 is positioned at a portion where the upper side and right side of image data 502 intersect.

Figure 17C:
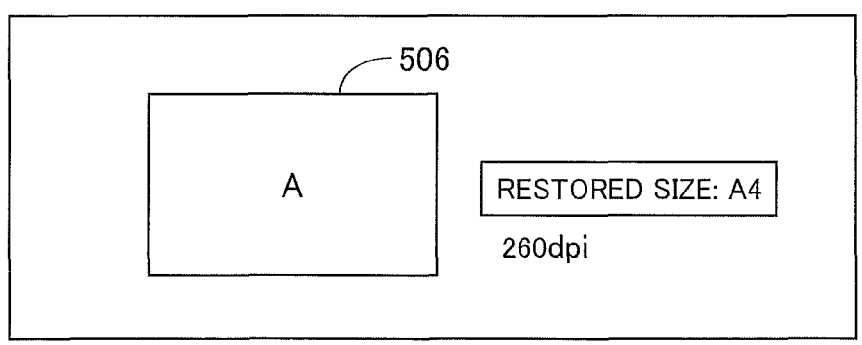

Image processing apparatus 52 executes the process of steps 410 and 412 shown in FIG. 13, thereby to erase the two-dimensional bar-code and rotates and enlarges image data 502. FIG. 17C shows the image resulting from the process of steps 410 and 412 performed on image data 502. Referring to FIG. 17C, the direction and size of image 506 are the same as those of image 500, and the two-dimensional bar-code is erased.

Figure 18A:
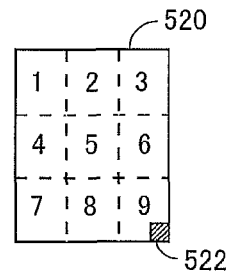
FIGS. 18A to 18B represent a manner how an image is restored.
Figure 18B:
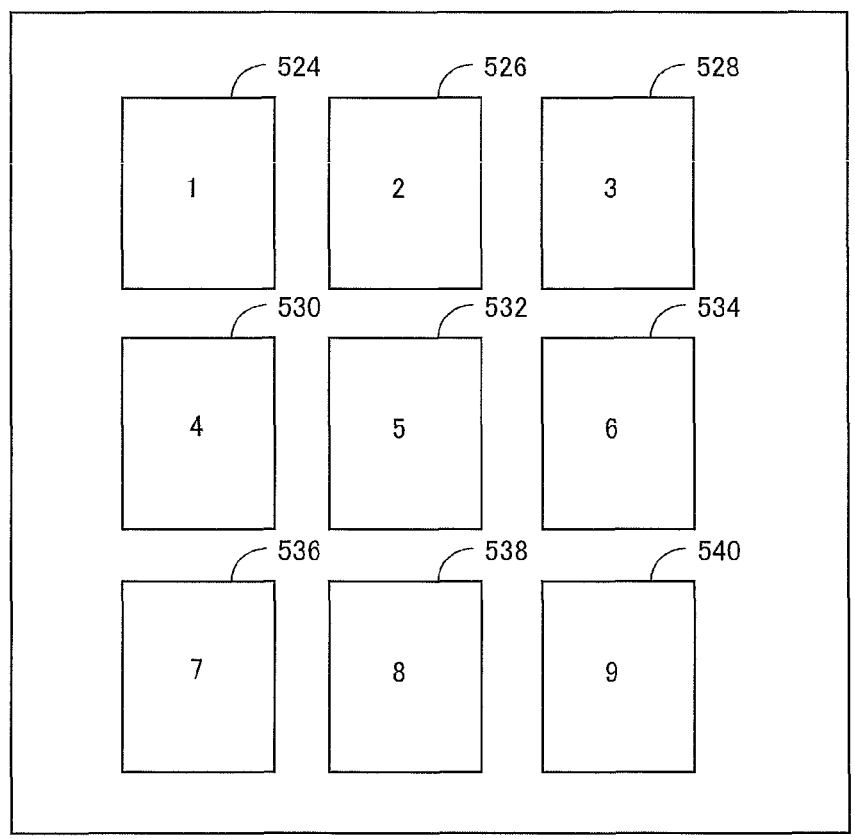

FIG. 18A shows an example of a 9-up printed document image. Referring to FIG. 18A, on the lower right portion of document 520, a two-dimensional bar-code 522 is printed and "lower right" is stored in "code added position" of the two-dimensional bar-code. Further, it is assumed that values same as the lengths of longer and shorter sides of document 520 are stored in the "size" of the two-dimensional bar-code. FIG. 18B shows an image obtained when the process of steps 410 and 412 is performed on document 520. Referring to FIG. 18B, the image of document 520 is divided into 9 images. The nine images are enlarged as images 524 to 540, each to have the same size as document 520. The two-dimensional bar-code printed on image 540 is erased.

Figure 19A:
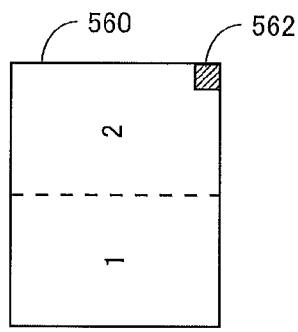
FIGS. 19A to 19C represent a manner how an image is restored.

FIG. 19A shows an image of a 2-up printed document. Referring to FIG. 19A, at an upper right portion of a document 560, a two-dimensional bar-code 562 is printed, and it is assumed that "upper right" is stored in "code added position" of the two-dimensional bar-code.

Figure 19B:
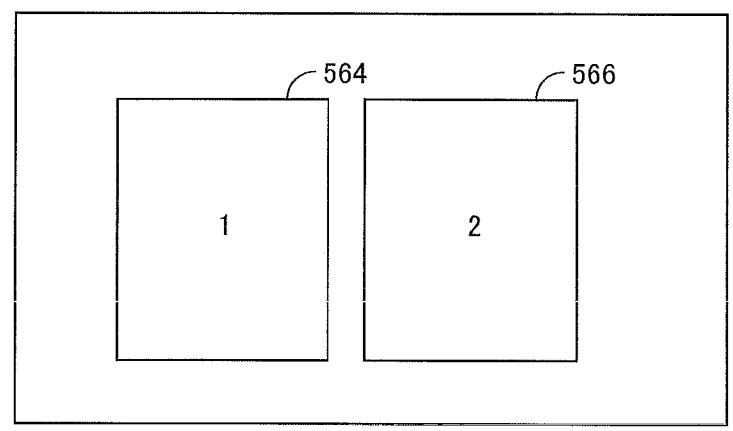

FIG. 19B shows a result when the process of steps 410 and 412 is executed on the image of document 560, if the value of size stored in the two-dimensional bar-code is larger than the size of document 560. Referring to FIG. 19B, the image of document 560 is divided and enlarged as images 564 and 566 in accordance with the size stored in the two-dimensional bar-code. The two-dimensional bar-code printed on image 566 is erased.

Figure 19C:
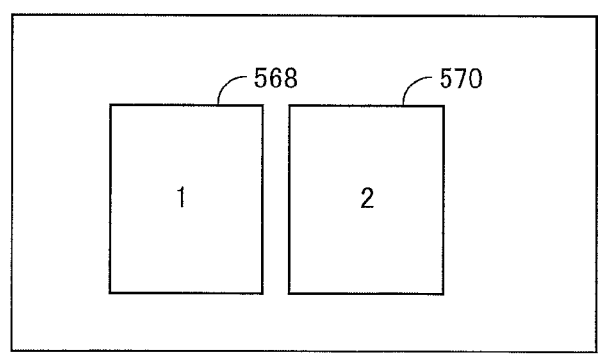

FIG. 19C shows a result when the process of steps 410 and 412 is executed on the image of document 560, if the value of size stored in the two-dimensional bar-code is the same as the size of document 560. Referring to FIG. 19C, the image of document 560 is divided as images 568 and 570. The two-dimensional bar-code printed on image 570 is erased.

Figure 20:
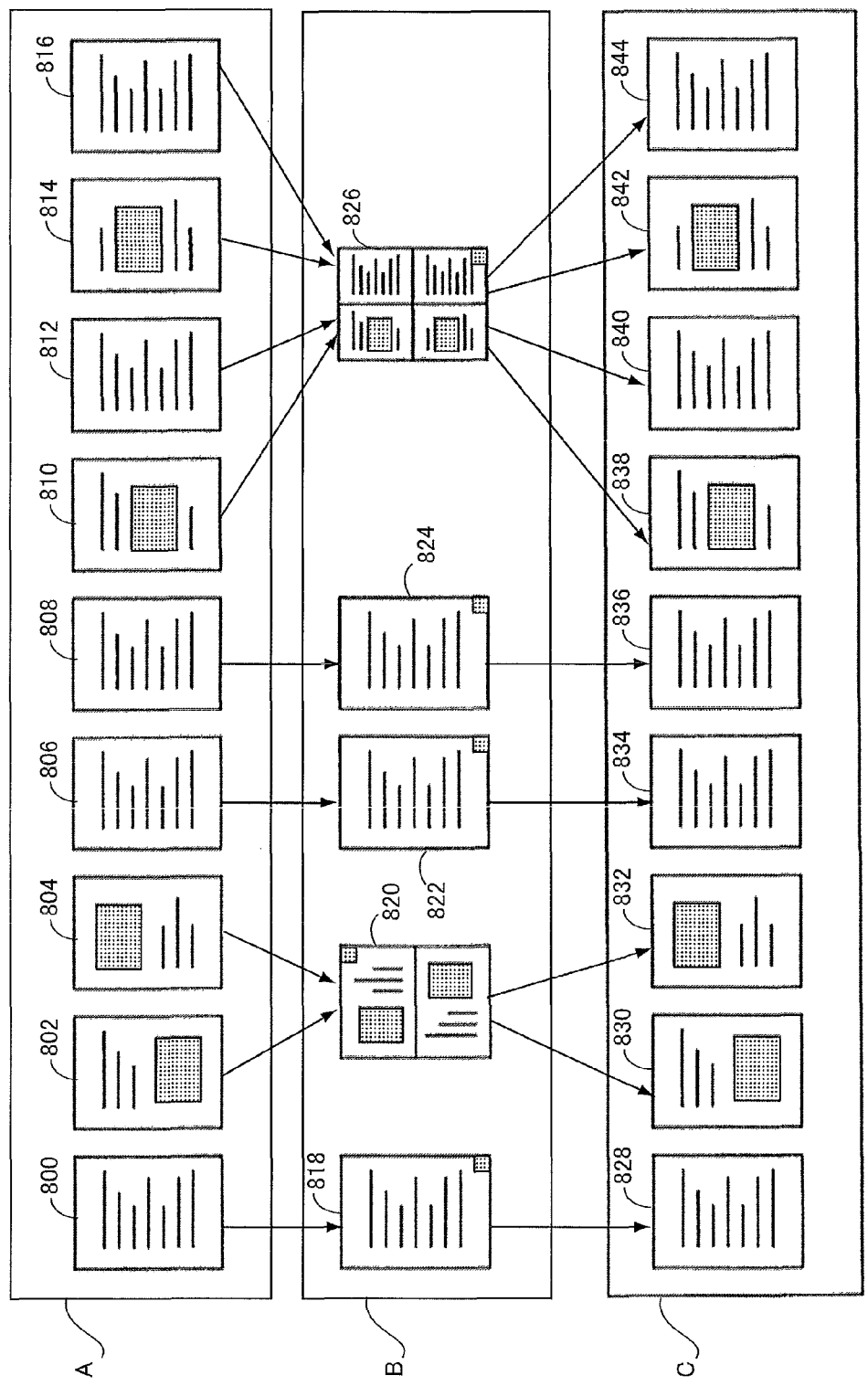
FIG. 20 represents a manner how an image is restored.

Figures in box A of FIG. 20 show examples of images when images of a plurality of pages are formed on an application of terminal 54. Referring to the figures in box A of FIG. 20, it is assumed that the user of terminal 54 formed images 800 to 816 on the application. It is assumed that the user sets print conditions such that image 800, images 802 and 804, image 806, image 808 and images 810 to 816 are 1-up printed, 2-up printed, 1-up printed, 1-up printed and 4-up printed, respectively.

Figures in box B of FIG. 20 show document images when images 800 to 816 are printed on the documents in accordance with the print conditions described above. Referring to the figures in box B of FIG. 20, documents 818 to 826 are the documents obtained by 1-up printing of image 800, 2-up printing of images 802 and 804, 1-up printing of image 806, 1-up printing of image 808, and 4-up printing of images 810 to 816, respectively. At corners of respective documents, two-dimensional bar-codes are printed.

Figures in box C of FIG. 20 show image data restored when image processing apparatus 52 reads the document images in order, from document 818 to document 826. Referring to the figures in box C of FIG. 20, an image 828 shows the image read from document 818. Images 830 and 832 show images restored from document 820. Images 834 and 836 show images read from documents 822 and 824, respectively. Images 838 to 844 show images divided and restored from document 826. No matter in which direction the images of documents 818 to 826 are read, image processing apparatus 52 can restore the images printed on respective documents as displayed on the application of terminal 54.

Figure 21:
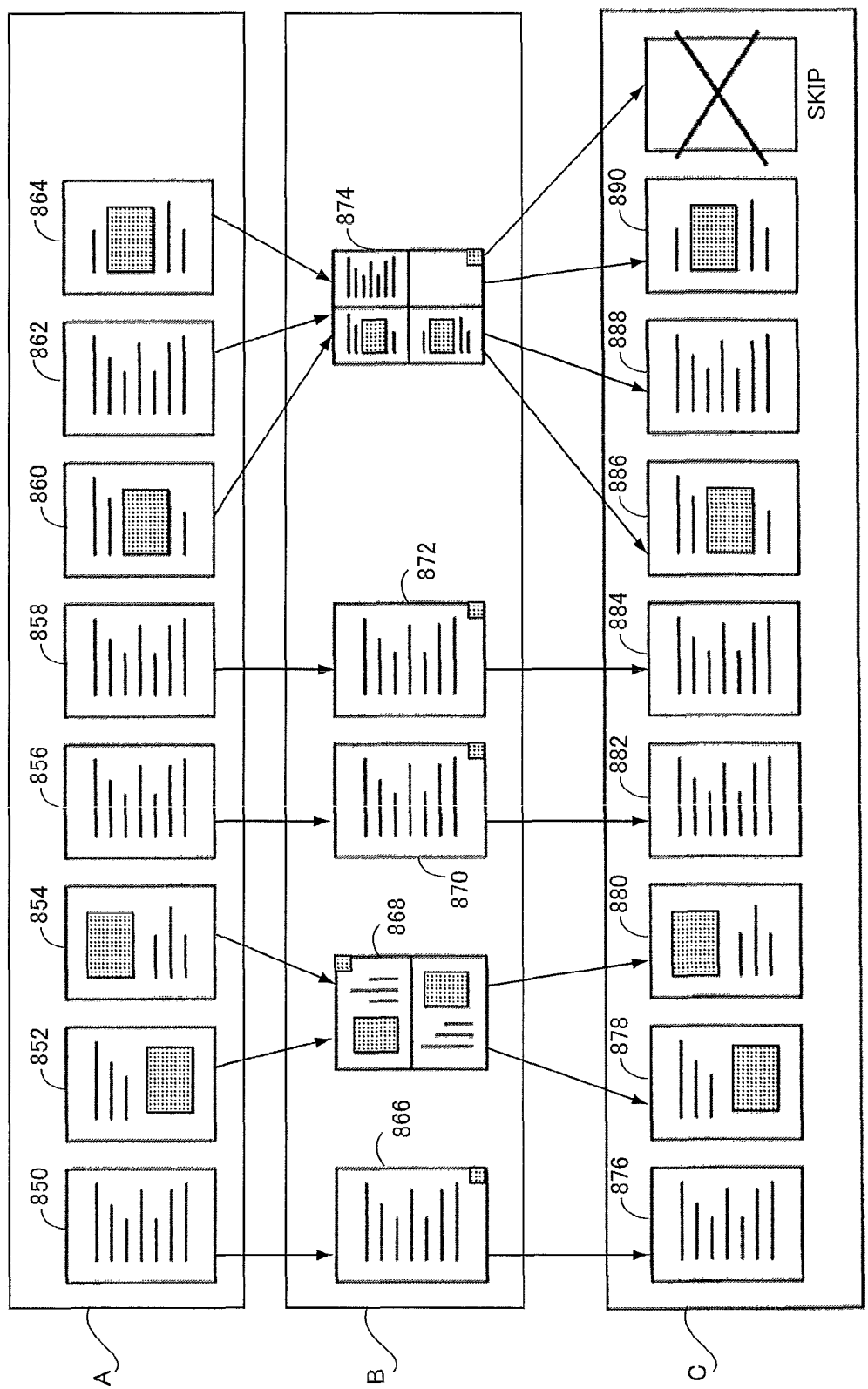
FIG. 21 represents a manner how an image is restored.

Figures in box A of FIG. 21 show examples of images when images of a plurality of pages are formed on an application of terminal 54. Referring to the figures in box A of FIG. 21, it is assumed that the user of terminal 54 formed images 850 to 864 on the application. It is assumed that the user sets print conditions such that image 850, images 852 and 854, image 856, image 858 and images 860 to 864 are 1-up printed, 2-up printed, 1-up printed, 1-up printed and 4-up printed, respectively.

Figures in box B of FIG. 21 show document images when images 850 to 864 are printed on the documents in accordance with the print conditions described above. Referring to the figures in box B of FIG. 21, documents 866 to 874 are the documents obtained by 1-up printing of image 850, 2-up printing of images 852 and 854, 1-up printing of image 856, 1-up printing of image 858, and 4-up printing of images 860 to 864, respectively. At corners of respective documents, two-dimensional bar-codes are printed. Since only three pages are printed on document 874, the lower right portion of document 874 is blank.

Figures in box C of FIG. 21 show image data restored when image processing apparatus 52 reads the document images in order, from document 866 to document 874. Referring to the figures in box C of FIG. 21, an image 876 shows an image read from document 866. Images 878 and 880 show images restored from document 868. Images 882 and 884 show images read from documents 870 and 872, respectively. Images 886 to 890 show images divided and restored from document 874. Since 3 is stored as the total number of pages in the two-dimensional bar-code of document 874, image processing apparatus 52 does not execute a process of storing the image corresponding to the blank page of document 874.

(Effects of the Present Embodiment)

As is apparent from the foregoing description, using network system 50 in accordance with the present embodiment, when a document once printed by printer apparatus 56 is read by image processing apparatus 52, an image having the same size and in the same direction as it is formed on the application can be restored. Therefore, no matter under what print conditions a document is printed, for example, even when N-up printing is designated for printer apparatus 56, restoration to the original document is possible. This makes it easier for the user to manage electronic data of images.

[Second Embodiment]

Figure 22:
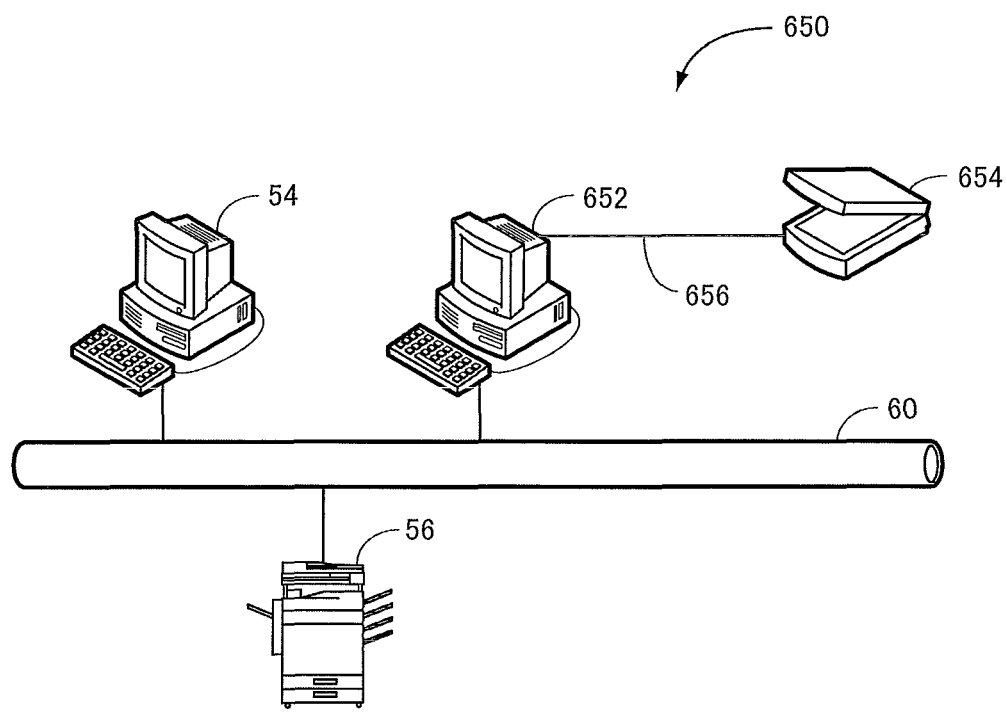
FIG. 22 shows an overall configuration of a network system 650 in accordance with a second embodiment of the present invention.

Referring to FIG. 22, a network system 650 in accordance with a second embodiment of the present invention includes: terminal 54; printer apparatus 56; a scanner apparatus 654 functioning as a scanner; and an image processing apparatus 652 such as a PC, USB-connected to scanner apparatus 654 through a communication line 656, for executing image processing similar to that of image processing apparatus 52 in accordance with the first embodiment on a document read by scanner apparatus 654. Terminal 54 and printer apparatus 56 are connected through LAN 60 to image processing apparatus 652.

The outer appearance and internal structure of scanner apparatus 654 are similar to the appearance shown in FIG. 6A and the internal structure shown in FIG. 6B, respectively.

Figure 23:
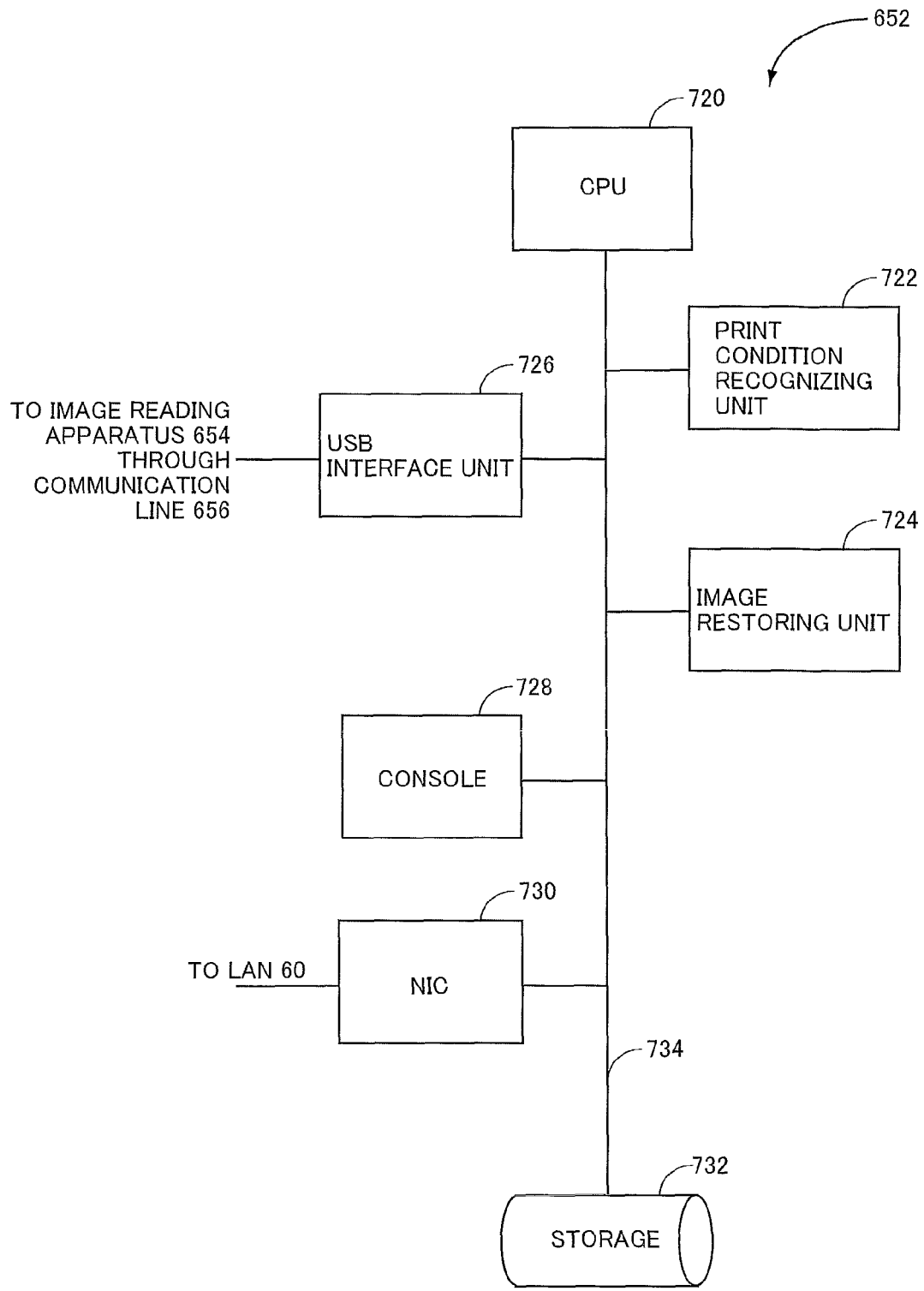
FIG. 23 is a block diagram showing an internal configuration of an image processing apparatus 652 shown in FIG. 22.

Referring to FIG. 23, image processing apparatus 652 includes: a console 728 having similar functions as console 82 shown in FIG. 2; a print condition recognizing unit 722 and an image restoring unit 724 having functions similar to those of print condition recognizing unit 258 and image restoring unit 260 shown in FIG. 7, respectively; an NIC 730 for data transmission/reception to/from other apparatuses through LAN 60; a USB interface unit 726 for USB connection to scanner apparatus 654 through communication line 656; and a storage 732 for storing various pieces of information such as a program.

Image processing apparatus 652 further includes: a bus 734 connected to console 728, print condition recognizing unit 722, image restoring unit 724, NIC 730, USB interface unit 726 and storage 732; and a CPU 720 connected to bus 734, for operating various components of image processing apparatus 652 and executing programs for realizing various functions.

Though software configuration of image processing apparatus 652 in accordance with the present embodiment is substantially similar to the software configuration in accordance with the first embodiment, it is different in that the user sets a document printed by printer apparatus 56 on scanner apparatus 654, and image processing apparatus 652 causes scanner apparatus 654 to read the document image.

Though the operation of network system 650 in accordance with the present embodiment is substantially similar to the operation of network system 50 in accordance with the first embodiment, it is different in that the user sets a document printed by printer apparatus 56 on scanner apparatus 654, and image processing apparatus 652 causes scanner apparatus 654 to read the document image.

EFFECTS OF THE INVENTION

According to the present embodiment, similar effects as the first embodiment can be attained by connecting the scanner apparatus to normal PC. Therefore, similar effects can be attained simply by down-loading the program for executing the above-described image processing to the PC, without the necessity to separately prepare the image forming apparatus. Therefore, the invention can be readily used by wide variety of users.

[Modification]

In the embodiments described above, a document is set on platen glass 206 by user and the document image is read. The present invention, however, is not limited to such an embodiment, and the document may be set on document set tray 162 and the document image may be read.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. An image processing apparatus reading a document image obtained based on an original image, comprising:
   a recognizing unit recognizing a mark on the read image;
   a confirming unit confirming, from the mark, contents of the mark recognized by said recognizing unit; and
   an image restoring unit, restoring, if it is confirmed by said confirming unit that a document forming condition is included in the mark, the read image to a state of the original image based on the document forming condition indicated by the mark.

2. The image processing apparatus according to claim 1, wherein
   said image restoring unit includes a direction restoring unit restoring, if it is confirmed by said confirming unit that document forming condition is included in the mark, direction of the read image based on the document forming condition indicated by the mark.

3. The image processing apparatus according to claim 2, further comprising an image input unit inputting said document image;

said confirming unit includes a position information confirming unit confirming position information related to a position where said mark is formed on the document image, based on the mark on the input image input to said image input unit; and said direction restoring unit restores the image direction of said input image, by comparing the position of the mark on said input image and said position information.

4. The image processing apparatus according to claim 3, wherein a plurality of images are drawn on divided areas of the document input to said image input unit;

the mark formed on the document allows confirmation of information related to area division of said document;

said confirming unit further includes an area division information confirming unit confirming the information related to the area division based on the mark on the input image; and said image restoring unit further includes a dividing unit dividing the image with said image direction restored, in accordance with the information related to the area division confirmed by said area division information confirming unit.

5. The image processing apparatus according to claim 4, wherein a plurality of images are N-up printed on the document input to said image input unit; and said area division information is N-up number.

6. The image processing apparatus according to claim 3, wherein said image input unit receives as inputs a plurality of document images;

a mark is formed on at least a first page of the document image of said plurality of document images; and if said recognizing unit fails to recognize a mark on each of images of the second and the following pages, said image restoring unit restores the images to states of original images in the same manner as the image of the first page.

7. The image processing apparatus according to claim 3, wherein said image input unit receives as inputs a plurality of document images;

a mark is formed on at least a first page of the document image of said plurality of document images; and said image restoring unit selectively executes a process of restoring the images to states of original images in the same manner as the image of the first page or not executing any process on the images, depending on whether or not said recognizing unit recognized the mark on each of images of the second and the following pages.

8. The image processing apparatus according to claim 3, wherein said image input unit includes a document placing table formed of a transparent member for placing a document, an exposure lamp arranged below said document placing table, and a document reading unit reading an image of the document, by detecting intensity of light emitted from said exposure lamp and reflected from the document placed on said document placing table.

9. The image processing apparatus according to claim 1, further comprising an erasing unit erasing the mark from an image restored by said image restoring unit.

10. The image processing apparatus according to claim 1, wherein the mark on the read image is a two-dimensional bar-code; and said confirming unit confirms contents represented by the two-dimensional bar-code recognized by said recognizing unit.

11. The image processing apparatus according to claim 1, wherein the mark formed on the document further allows confirmation of size of said original image;

said confirming unit further includes a size confirming unit confirming the size of said original image from the mark recognized by said recognizing unit; and said image restoring unit further includes a size restoring unit enlarging or reducing said read image so that the size of said read image matches the size of the original image confirmed by said size confirming unit.

12. A terminal connected to a printer apparatus, comprising:

an image generating unit allowing a user to generate image data; and a mark forming unit forming a mark on a print image when the image data generated by said image generating unit is printed, in response to a user instruction; wherein the mark formed on the image data by said mark forming unit allows confirmation of condition for generating the image data;

said terminal further comprising a transmitting unit transmitting a print instruction instructing printing of the image data with the mark formed, to said printer apparatus.

13. The terminal according to claim 12, wherein said mark forming unit forms a mark only on a first page of printed images when said print image includes a plurality of pages.

14. The terminal according to claim 13, wherein said print image has a rectangular shape; and said mark forming unit forms a mark at any of corner areas of said print image.

15. The terminal according to claim 14, wherein said mark forming unit forms no mark on said print image when none of the corner areas of said print image is blank;

said terminal further comprising an indicating unit indicating for user, if no mark is formed by said mark forming unit on said print image, that formation of a mark is impossible.

16. A printer apparatus connected to a terminal, comprising:

a receiving unit receiving a print instruction instructing printing of a print image having a mark formed thereon, from said terminal; and;

a printing unit printing, in response to reception of said print instruction by said receiving unit, said mark of said print image with invisible ink invisible to human eyes, and images other than said mark of said print image with normal ink, on a sheet of recording paper; wherein said mark contains conditions for forming, from an original image, the images other than said mark of said print image, and allows for the images other than said mark of said print image to be restored to a state of the original image.

17. An image processing method, comprising:

an image generating step at which a user generates image data; and a mark forming step of forming a mark on a print image when the image data generated at said image generating step is printed, in response to a user instruction; wherein the mark formed on the image data at said mark forming step allows confirmation of condition for generating the image data;

said image processing method further comprising:

a printing step of printing said print image on a sheet of recording paper;

an image reading step of reading the print image printed on said sheet of recording paper at said printing step;

a recognizing step of recognizing the mark on the image read at said image reading step;

a confirming step of confirming, from the mark, contents represented by the mark recognized at said recognizing step; and an image restoring step of restoring, if it is confirmed at said confirming step that the mark includes condition for generating the image data, the read image to a state of an original image, based on the condition for generating the image data represented by the mark.

18. The image processing method according to claim 17, wherein said printing step includes a step of printing said mark of said print image with invisible ink invisible to human eyes, and images other than said mark of said print image with normal ink, on a sheet of recording paper.

* * * * *